US00RE47457E

(19) United States
(12) Reissued Patent
Fateh et al.

(10) Patent Number: US RE47,457 E
(45) Date of Reissued Patent: Jun. 25, 2019

(54) CONTROL OF DISPLAY CONTENT BY MOVEMENT ON A FIXED SPHERICAL SPACE

(71) Applicant: Facebook, Inc., Menlo Park, CA (US)

(72) Inventors: Sina Fateh, Sunnyvale, CA (US); Ray Valdes, Davis, CA (US); John Masiewicz, San Jose, CA (US)

(73) Assignee: Facebook, Inc., Menlo Park, CA (US)

(21) Appl. No.: 14/831,870

(22) Filed: Aug. 20, 2015

Related U.S. Patent Documents

Reissue of:
(64) Patent No.: 7,365,734
Issued: Apr. 29, 2008
Appl. No.: 10/775,762
Filed: Feb. 9, 2004

U.S. Applications:
(63) Continuation of application No. PCT/US02/24981, filed on Aug. 6, 2002.

(60) Provisional application No. 60/310,870, filed on Aug. 7, 2001.

(51) Int. Cl.
*G09G 5/08* (2006.01)
*G06F 1/16* (2006.01)

(52) U.S. Cl.
CPC ..... *G06F 1/1694* (2013.01); *G06F 1/1626* (2013.01); *G06F 2200/1637* (2013.01)

(58) Field of Classification Search
CPC ..... G06F 1/1694; G06F 1/1626; G06F 2200/1637
USPC ..... 345/156–184; 463/36–39
See application file for complete search history.

(56) References Cited

U.S. PATENT DOCUMENTS

| | | | | |
|---|---|---|---|---|
| 5,506,605 | A * | 4/1996 | Paley | 345/163 |
| 5,602,566 | A * | 2/1997 | Motosyuku et al. | 345/684 |
| 5,910,797 | A | 6/1999 | Beuk | |
| 6,072,467 | A * | 6/2000 | Walker | 345/157 |
| 6,184,847 | B1 * | 2/2001 | Fateh et al. | 345/8 |
| 6,201,554 | B1 * | 3/2001 | Lands | 345/169 |
| 6,228,704 | B1 | 9/2001 | Flack et al. | |
| 6,288,704 | B1 * | 9/2001 | Flack et al. | 345/158 |
| 6,466,198 | B1 * | 10/2002 | Feinstein | 345/158 |
| 6,690,358 | B2 * | 2/2004 | Kaplan | 345/158 |
| 6,847,351 | B2 * | 1/2005 | Noguera | 345/158 |

OTHER PUBLICATIONS

PCT International Search Report, PCT Application No. PCT/US2002/024981, Dec. 10, 2002, one page.
United States Office Action, U.S. Appl. No. 10/775,762, dated May 31, 2007, seven pages.

* cited by examiner

*Primary Examiner* — Dennis G Bonshock
(74) *Attorney, Agent, or Firm* — Fenwick & West LLP

(57) ABSTRACT

The present invention addresses the above described problems by simplifying the assumptions on possible motions made by a user. This simplification process can take place by making an assumption that the motion of the device will travel along a certain preferential motion arc, which will be referred to herein as the "Javal arc." Calculations of motions of the device can be made based on these Javal arcs. Additionally, the double integration of each accelerometer is now eliminated and the expensive accelerometers are replaced by two magnetic sensors.

16 Claims, 25 Drawing Sheets

NORMAL ORIENTATION

TOP VIEW

TOP VIEW

CONTROL OF DISPLAY CONTENT BY MOVEMENT ON A FIXED SPHERICAL SPACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue of U.S. Pat. No. 7,365,734, filed Feb. 9, 2004 and issued Apr. 29, 2008, and is a Continuation of PCT/US02/24981, filed Aug. 6, 2002, which claims the benefit of U.S. Provisional Application No. 60/310,870, filed Aug. 7, 2001.*

FIELD OF THE INVENTION

This invention relates to electronic devices, more specifically, to the control of display content for electronic devices.

BACKGROUND OF THE INVENTION

Portable electronic devices are generally controlled by input devices located on the portable device, such as a button, or pen touch computing. A typical portable electronic device 20 is depicted in Prior Art FIG. 1, and includes a display screen 24, and a control area 25, an input touch area 26, an adapter 28 and a series of control buttons 30, 32, 34, 36, and 38. The display is usually controlled by the pen input to a scroll bar in the screen control area 25, or a control buttons 30, 32, 34, 36, and 38

Other methods have been developed to control the display of a portable electronic device with the use of user initiated motion. One such method invented by the applicant is embodied in U.S. Pat. No. 6,184,847, which is represented by prior art FIG. 2 in which the display of the portable electronic device 20 responds to user controlled motion of a user 100. Other devices such as the Compaq Rock-n-Scroll™ represented by prior art FIG. 3A and FIG. 3B, use only user's 100 tilt of the portable device 20 to control the display. Such portable devices 20 usually comprise multiple sensing devices such as accelerometers in order to detect user initiated motion. Such devices usually require the use of multiple accelerometers which can add greatly to the expense of the portable device.

Additionally, the calculation required from the input of several accelerometers can add greatly to the computational problems of controlling a display with such types of motions sensors. Although, simple threshold types of motions such as a 45 degree tilt can easily control a display for simple commands such a scroll left or scroll right, calculation that requires more fine tuning will use a great deal more computing power to integrate the data from the three accelerometer or gyroscope readings. For example the motions of the portable device will result in logic having to integrate the voltage readings from two accelerometers.

The accelerometer can be used to measure motion in any direction, including a "tilting" of the device. The distance an object has been moved is the integral of velocity over time. Essentially, the integral is a fairly complicated calculation on a device that may be running less than 8 M or RAM and while single calculations do not present a serious problem, continuous calculation from constant movement will require a great deal of system resources.

Normally, to measure the distance and object has traveled with accelerometers, it is necessarily to integrate twice. This amount of integration can lead to a great deal of error, even with the most accurate of accelerometers, what is needed is a way to predict some of the parameters of motion based on a normal users movement, instead of integrating several accelerometers at the same time.

What is needed is a method of calculating the motion or position of a portable device that does not require the expense and computational complexity of multiple accelerometers or other motion sensor, in order to control the display of the device.

SUMMARY OF THE INVENTION

The present invention addresses the above described problems by simplifying the assumptions on possible motions made by a user. This simplification process can take place by making an assumption that the motion of the device will travel along a certain preferential motion arc, which will be referred to herein as the "Javal arc." Calculations of motions of the device can be made based on these Javal arcs. Additionally, the double integration of each accelerometer is now eliminated and the expensive accelerometers are replaced by two magnetic sensors.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The Javal arc is mainly used in connection with optical measurement devices and it is generally used as a medical term. However, since the display of a computer or electronic device has to do with vision, the Javal arc can be applied to the system of screen display viewing as well. Javal was a French physician who developed measurements for lines of sight, which has been applied mainly to opthamalogic devices for almost a century. However, the Javal arc can be used to measure the natural motion of lines of sight and motion related thereto. In the present invention the Javal arc is used as a computational assumption or a constant in order to eliminate expensive accelerometers and valuable computing power in a portable electronic device. There are 3 components to the Javal arc that extends out from the comfortably stretched arm of the user.

In order to avoid the difficulty of double integration in the calculation method for determining the motion of the device, a simpler and more accurate method of the present invention teaches a way to more accurately calculate movement from less expensive components, such as magnetometers. In one embodiment this control method requires only one accelerometer, and two inexpensive magnetometers. In yet another embodiment, two inexpensive magnetometers and a gyroscope may be used in the place of an accelerometer.

Distance traveled is the integral of velocity over time. Needless to say, for motions that last a fraction of a second, this can be very taxing on the calculation resources on a small electronic device where computing resources are already scarce. It can also be wildly inaccurate as can be appreciated by those skilled in the art.

Generally speaking, a small portable display screen will not have the capacity to display an entire desktop computer screen worth of graphics and text at one time. Although, some solutions, like for those on PDAs have proposed a new set of display requirements, such as web clipping, which are wholly inadequate to display the graphics of a normal computer display. The invention teaches a way to control the buffered display of an entire virtual display which will not fit on the display screen of the device, using the Javal arc motion and related computation aspects described herein.

Control of the display 26 of the portable electronic device 20 will be effectuated by motion of the device by a user. This is described above in the prior art description of control of the display of a device through a motion of the user. However, the user of a portable electronic device will not move the device equivalent to a normal Cartesian set of coordinates, or any other perfectly ordered geometrical system (cylindrical, etc.). The user will move the device in a manner that is natural to the user's eye and hand coordination, and is described with respect to a Javal arc movement coordinate system.

Figure 1:
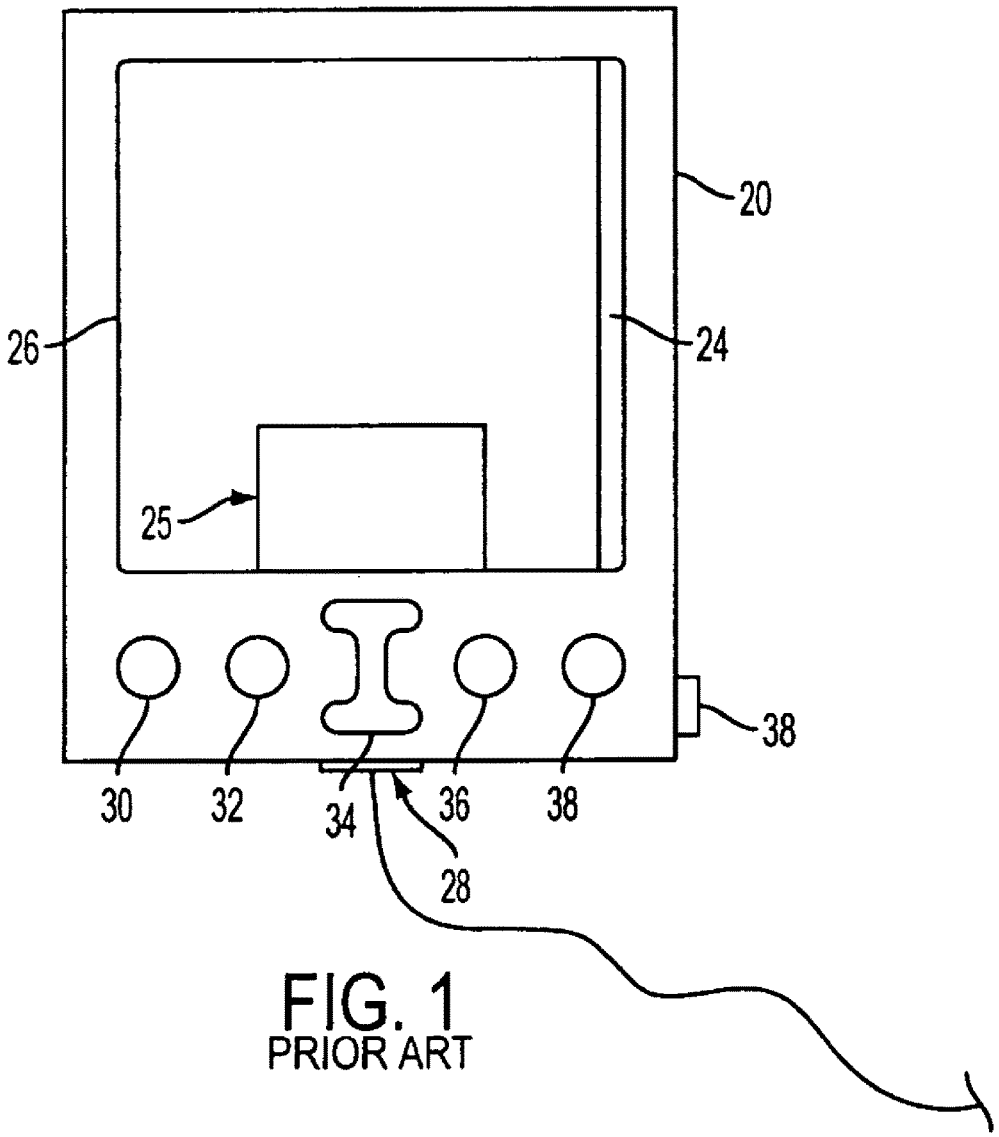
FIG. 1 PRIOR ART
FIG. 1 represents a typical prior art portable electronic device.
Figure 2:
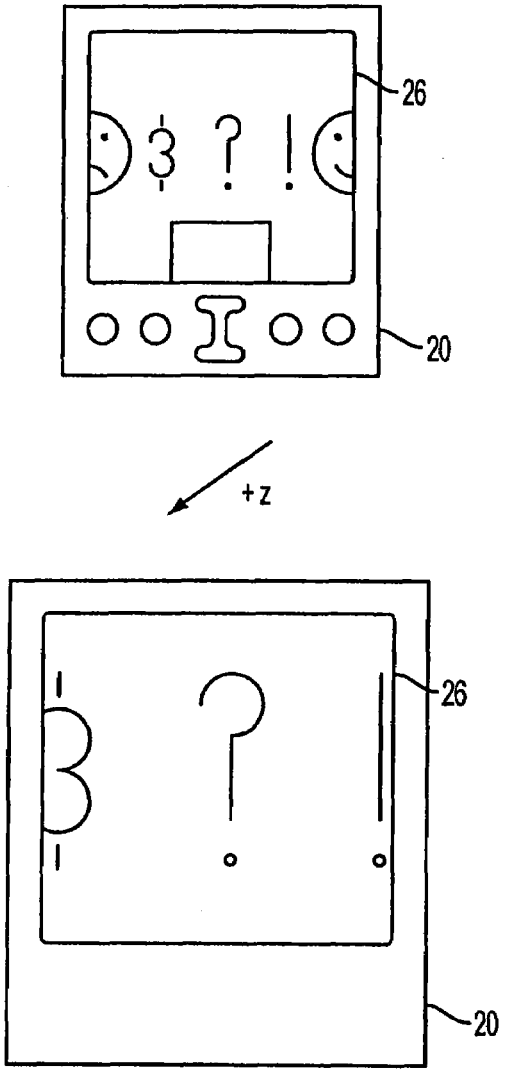
FIG. 2 PRIOR ART
FIG. 2 represents a prior art method of controlling a display using intuitive controlled motion.
Figure 3A:
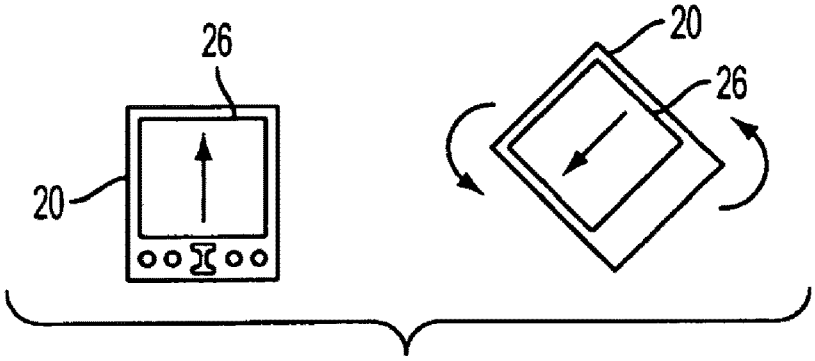
FIG. 3A PRIOR ART
FIG. 3A represent the prior art of using "tilt" to input display command on a portable electronic device.
Figure 3B:
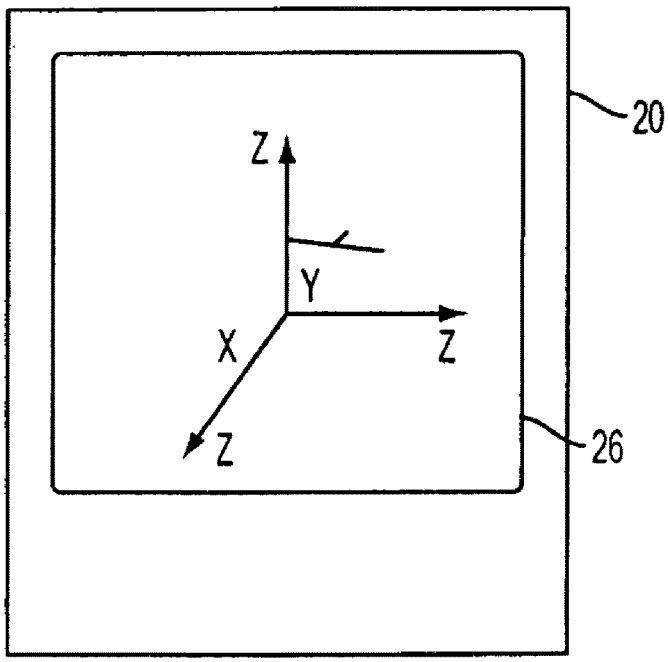
FIG. 3B PRIOR ART
FIG. 3B represents a prior art attempt to determine motion using 3 accelerometers.
Figure 4:
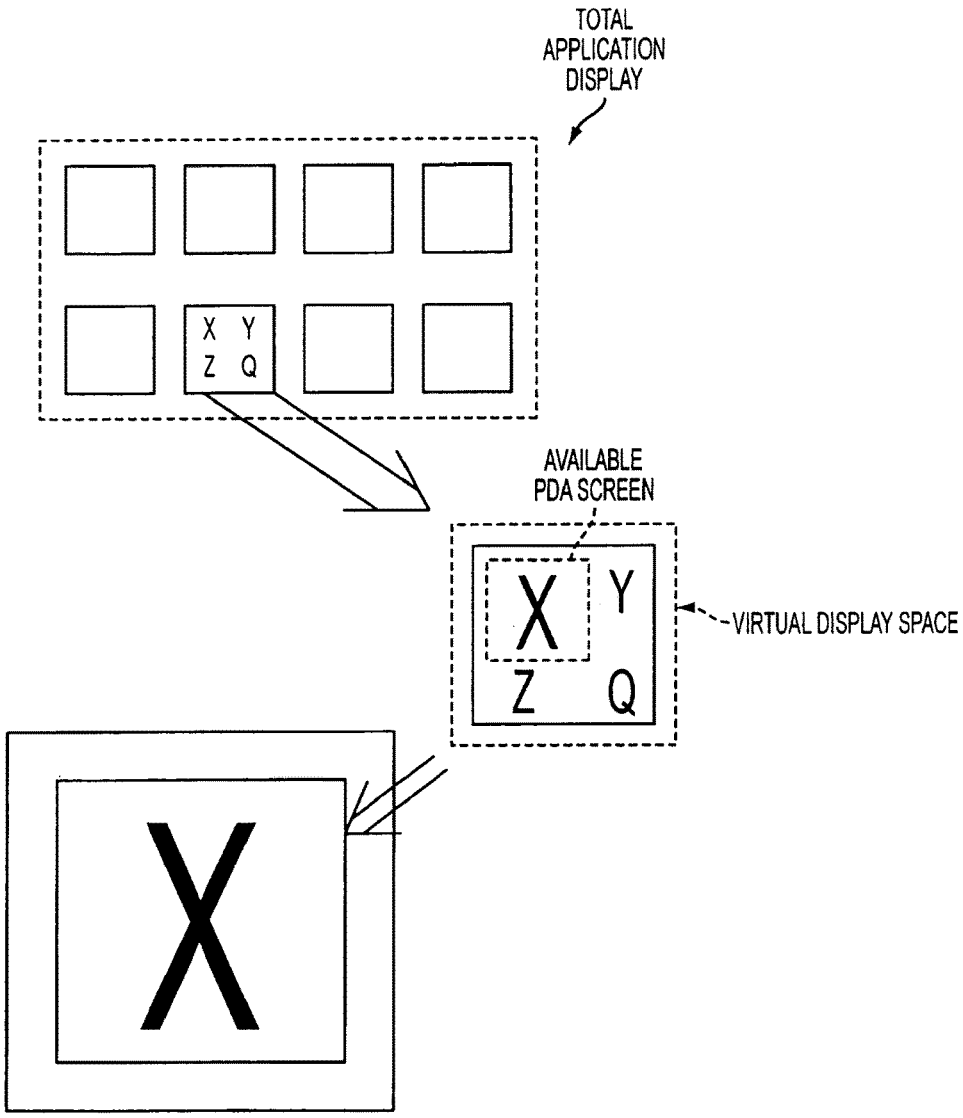
FIG. 4 is the representation of the virtual display space to the content display as converted in the present invention.

The present invention uses the expression "virtual display space" to define the entire of amount of graphics that may be presented. FIG. 4 is the representation of the virtual display space to the content display as converted in the present invention.

Other expressions used in this capacity are "performance space" and "virtual desktop." The expression "virtual screen" is a related concept to virtual display space, but is more limited in that the virtual screen has the equivalent virtual display space of only one desktop screen. The present invention distinguishes between virtual display space and a virtual screen, because of the manner in which the display memory will store and access such data. For example, a PDA graphic memory may store an entire virtual screen in a easily accessed buffer, but other screens are stored in cache or loaded as they become needed in the buffer. A more powerful device with a larger display buffer may be able to load an entire document. For the purposed of this disclosure, the expression virtual display space is primarily used. When discussing content from the Internet or an equivalent computer display, the expression virtual screen may be used but is distinguished from virtual display space.

Figure 5A:
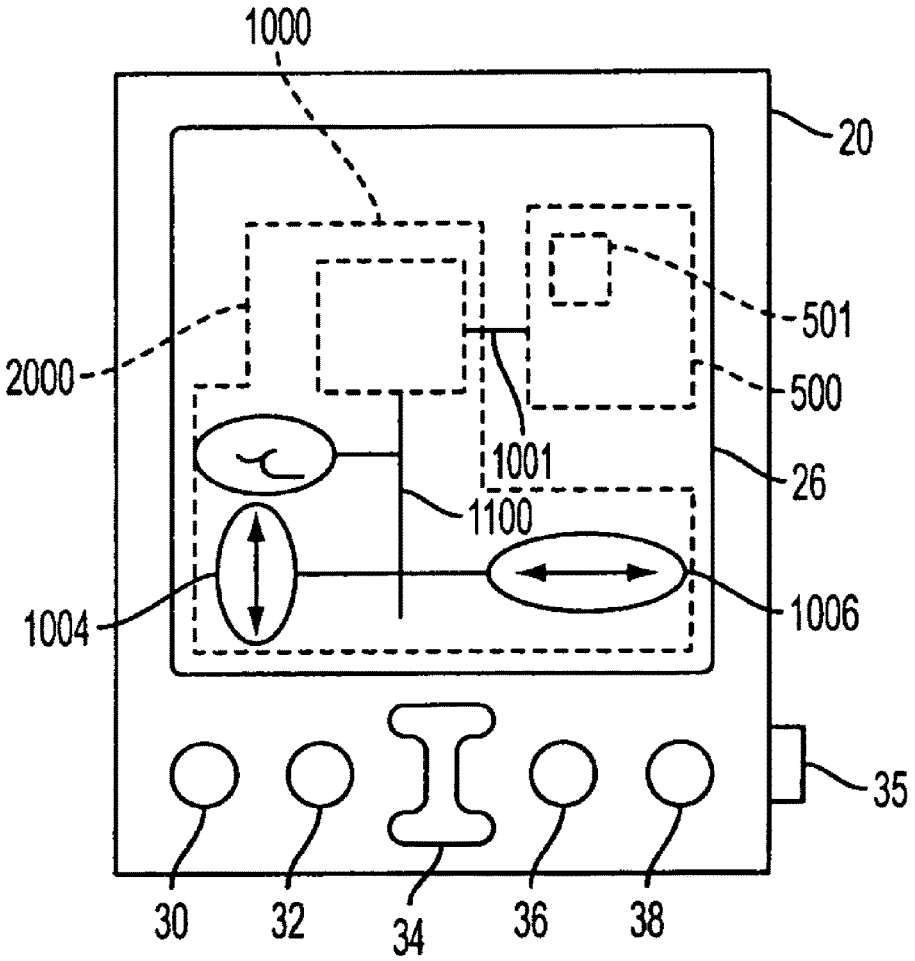
FIG. 5A represents a the hardware configuration of the present invention in a preferred embodiment on a PDA.
Figure 5B:
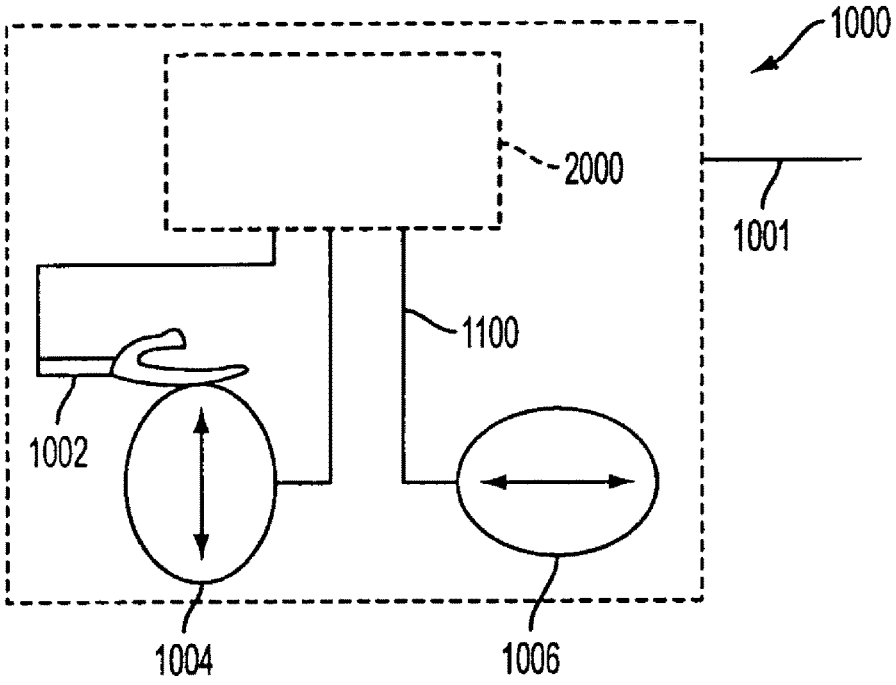
FIG. 5B is detail of FIG. 5A for the motion control system of the present invention.

Referring now to FIG. 5A, a sample electronic device 20 implementing the present invention is shown. The PDA 20 includes a single or series of microprocessors and controllers represented by 500, which may include a graphic memory buffer 501 for a virtual display. The fixed sphere motion control system 1000 comprises an accelerometer 1002 one or more magnetometers 1004 and 1006, an electrical signal connector 1100 and motion and position calculation logic 2000. The fixed motion control system 1000 is coupled with the control system of the PDA 20 through a series of logical connects 1001. FIG. 5B is the fixed motion control system 1000 in greater detail.

Figure 6A:
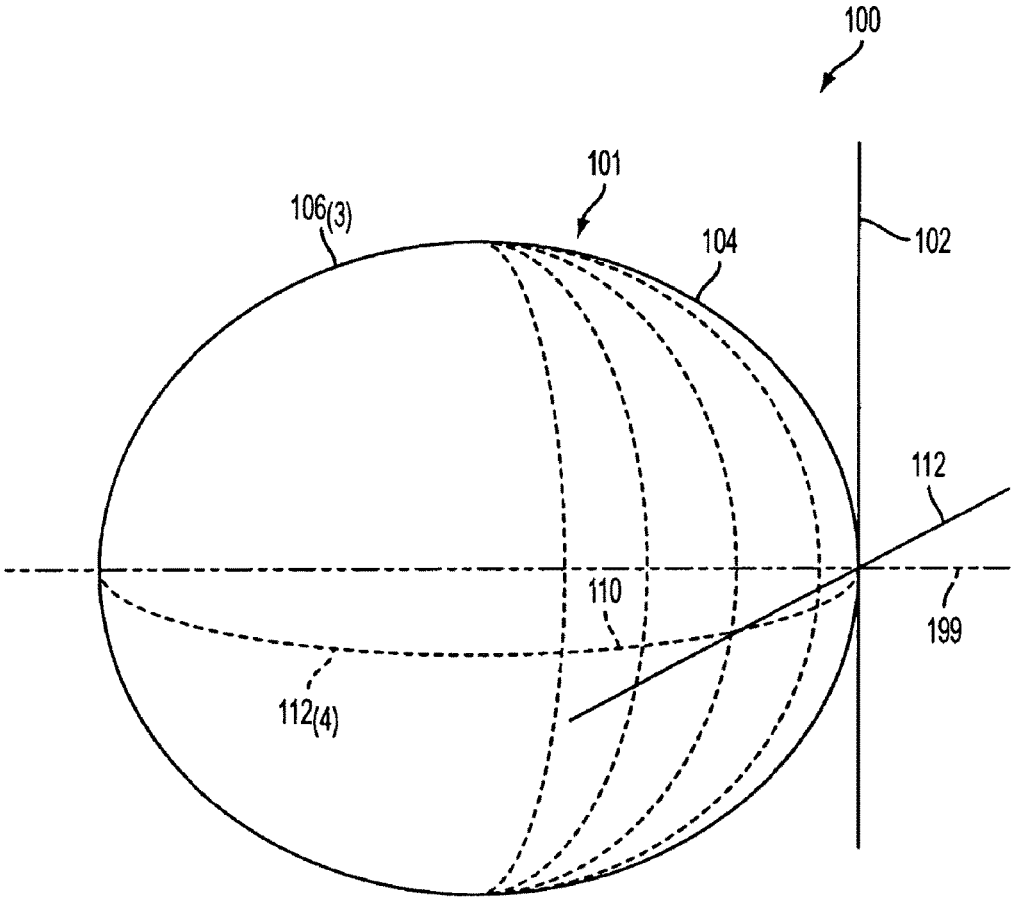
FIG. 6A is a representation of a Javal arc movement sphere.
Figure 6B:
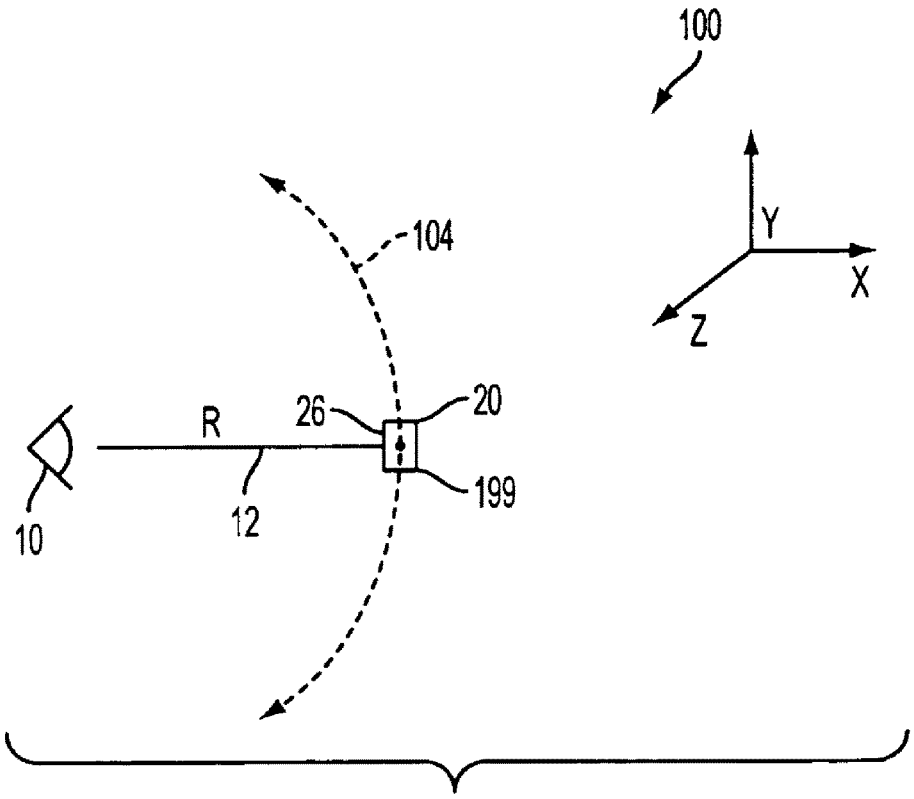
FIG. 6B represents the portable electronic device in centered position on the Javal arc of motion as applied to the present invention.

Referring now to FIG. 6A and FIG. 6B, a Javal arc movement coordinate system of motion 100 as is used by the present invention is described. The locus of a user 10 is generally where they would be viewing, so approximately at the eye. A preferred distance R along the radial axis 12 is usually between 35-40 cm from the user locus 10. However, as will be described below, the radial axis 12 may vary with user preferences and other factors such as the height of the user or the preference of the viewing distance of the device (which is adjustable in a preferred embodiment). The vertical component of the Javal arc 104 will move along the primary axis of a fictional vertical ellipse 104, that will be nearly circular in form. The center of the vertical ellipse 106 will be close to the user locus 10, but not necessarily because of variations in movements of the PDA 20. The horizontal Javal arc 110 will be located on fictional horizontal ellipse 112, which as the vertical ellipse 104 will have its locus.

Thus the "panning" motion of the portable electronic device 20 will generally travel on a portion of a spheroid 101 like coordinate system 100 in which the two Javal arcs which meet at the central viewing point 199 and define the surface of motion in which the user moves the device. The user does not need to move the device along either of the arcs 104 110 to effectuate control of the display of the device but will tend to move the device anywhere on the surface of the spheroid 101. The angle of the movement along either arc 104 110 will be proportional the angle that the user 10 is holding the device 20 away from its normal axis. These angles are described in detail below.

Referring now to FIGS. 6B-11C, a system for controlling the displayed portion 26 of a virtual display 99 which may be stored or rendered in the memory buffer 501 (or other control commands) of the portable electronic device 20 by calculating the movement of the device 20 is displayed and each corresponding content screen 600 resulting from the movement or repositioning. The present invention uses the angle(s) of the device from the normal as a method for determining the distance traveled in the vertical direction. This is exemplified in the sequence of illustrations from FIG. 6B-11C. In FIG. 6B, the user 10 is holding the device 20 a radial distance 12 from the user's origin of vision or other reference point straight out from the user 10. The PDA 20 is not tilted at an angle because there has been no movement along the Javal arcs 104 and 110.

Figure 6C:
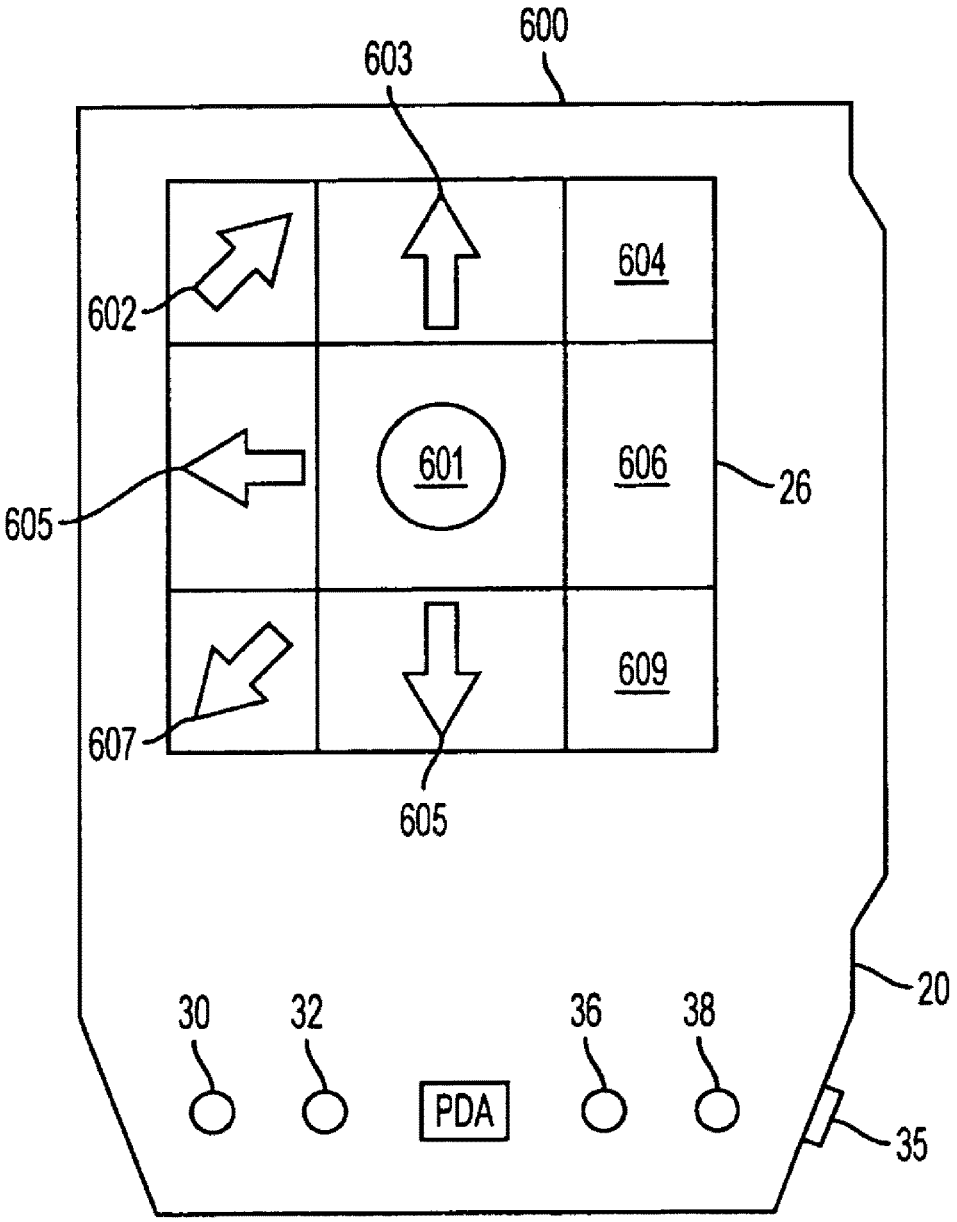
FIG. 6C represents the screen of a sample at position in FIG. 6B.
Figure 6D:
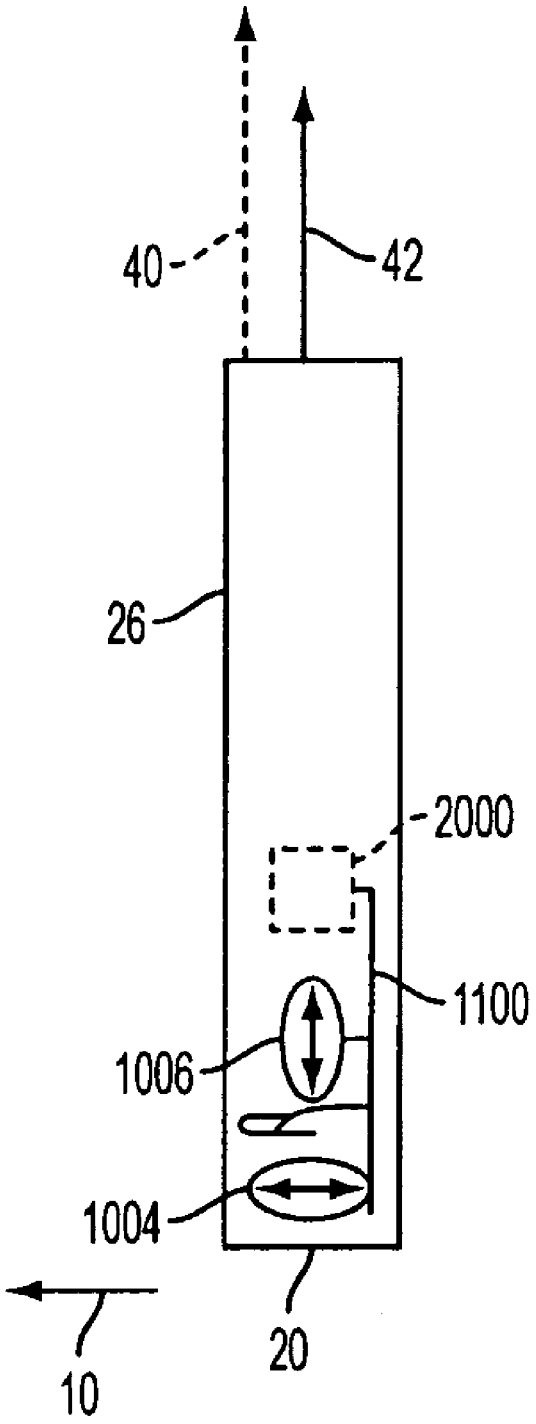
FIG. 6D represents a detailed view of the PDA at the position in FIG. 6B.

Referring now to FIG. 6C, a corresponding content display 600 located on the portable electronic device 20 display 26 is shown. For illustrative purposes the content screen 600 is divided up into 9 central regions 601-609, including a central region 601. In FIG. 6C, since the device has not moved from its initial reference point 199, the content screen 600 is centered at its initial state. Although in a preferred embodiment the content screen 600 could start at another orientation or initial location. FIG. 6D is a depiction of the PDA 20 side view when located at point 199, with the component parts represented.

Figure 7A:
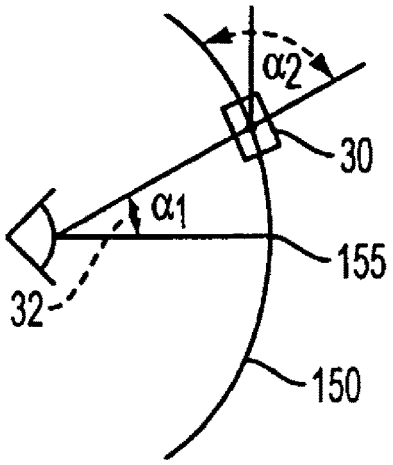
FIG. 7A represents the portable electronic device above the horizontal axis of view position on the vertical Javal arc of motion as applied to the present invention.
Figure 7B:
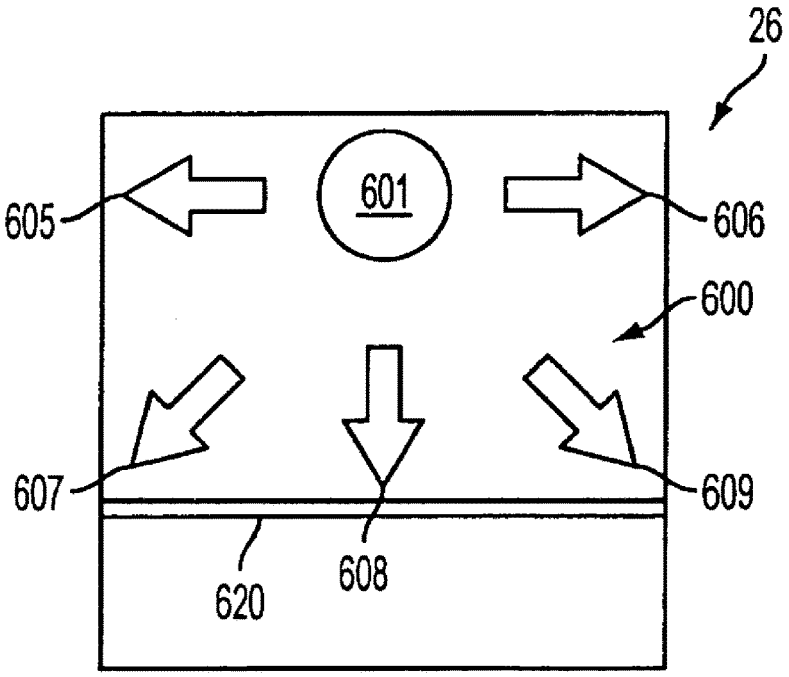
FIG. 7B represents the screen of a sample PDA at position in FIG. 7A.
Figure 7C:
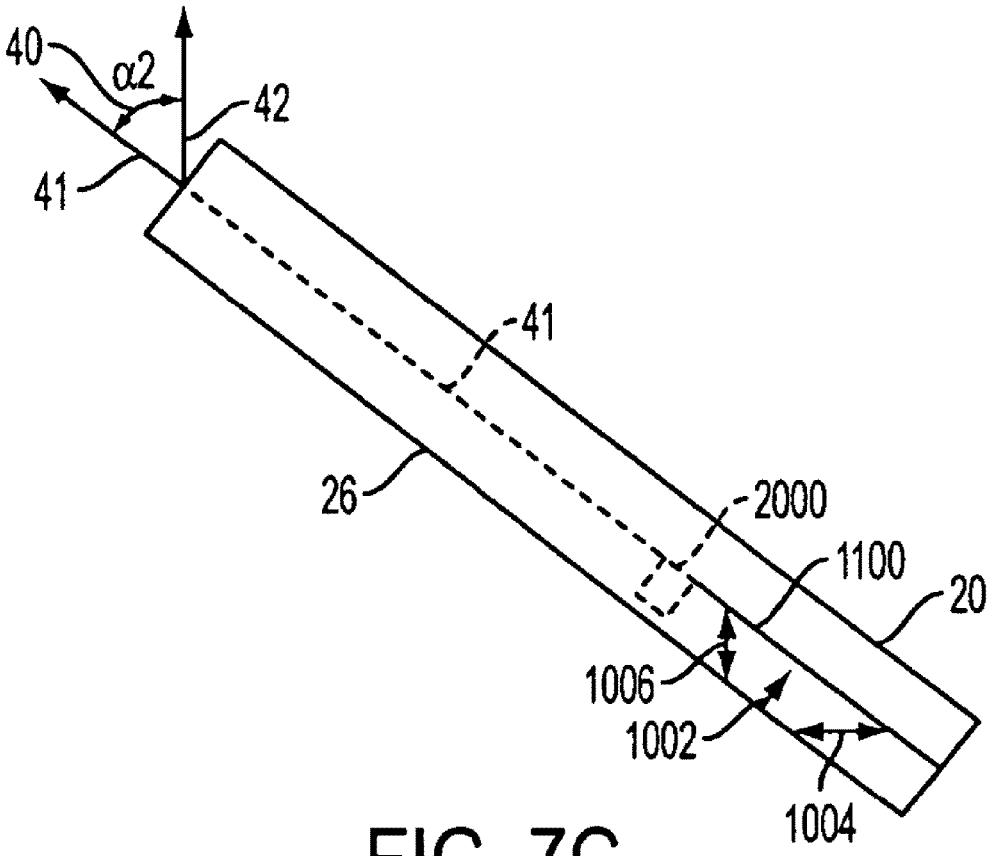
FIG. 7C represents a side view of the PDA of FIGS. 7A-7B.
Figure 8A:
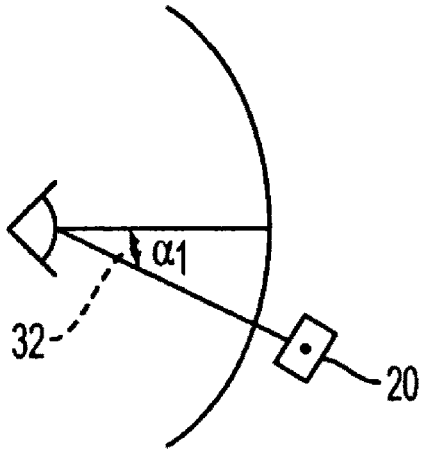
FIG. 8A represents the portable electronic device below the horizontal axis of view position on the vertical Javal arc of motion as applied to the present invention.
Figure 8B:
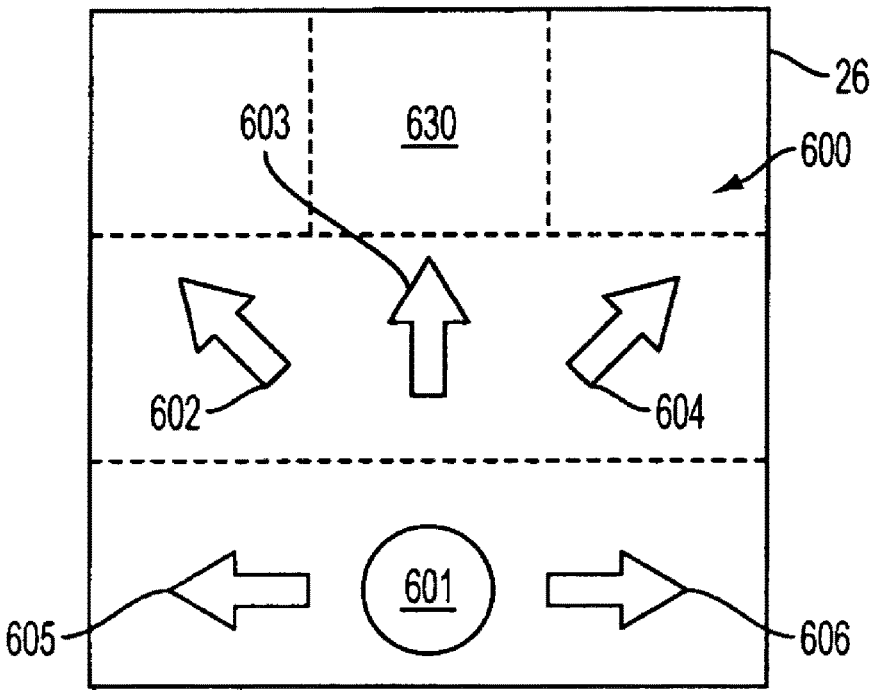
FIG. 8B represents the screen of a sample PDA at position in FIG. 8A
Figure 8C:
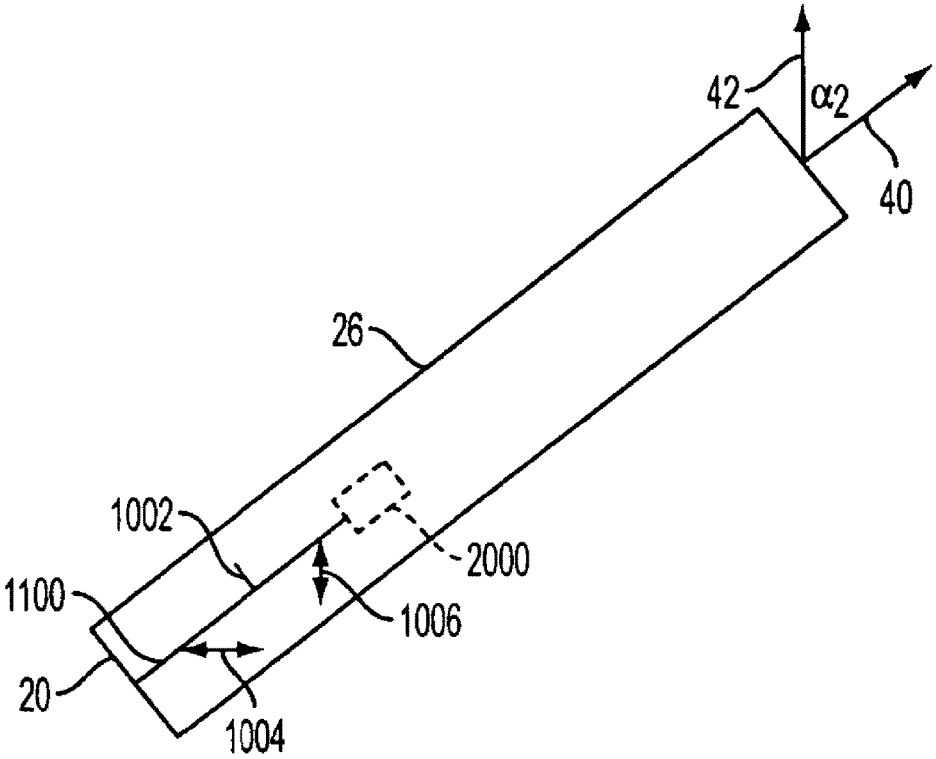
FIG. 8C represents a side view of the PDA of FIGS. 8A-8B.

In FIG. 7A the user 10 is holding the portable electronic device 20 at an angle α(1) 30 above the vertical normal of the user's line of sight 12 along the horizontal axis (or above the horizontal axis straight in front of the user). In addition when the PDA 20 is held at angle α(1) 30, it will be naturally held at a second angle α(2) 40 at which the vertical axis of the portable electronic device 41 will make with the normal vertical 42. This is illustrated in FIG. 7C. The present invention takes advantage of the fact that generally α(1) 30 will be proportional to α(2) 40 as will be explained in the position and motion logic below. The corresponding screen to position or motion represented in FIG. 7A is represented in FIG. 7B, where region 601 is now moved upward and a bottom region of the virtual display space 620 is represented. In FIG. 8A the user 10 is holding the portable electronic device 20 at an angle α(1) 30 below the vertical normal of the user's line of sight 12 along the horizontal axis The PDA 20 is held at angle α(1) 30, it will also be naturally held at a second angle α(2) 40 in the opposition direction of FIG. 7C and is illustrated in FIG. 8C. The corresponding screen to position or motion represented in FIG. 8A is represented in FIG. 8B, where region 601 is now moved downward and a top region of the virtual display space 630 is represented.

Figure 9A:
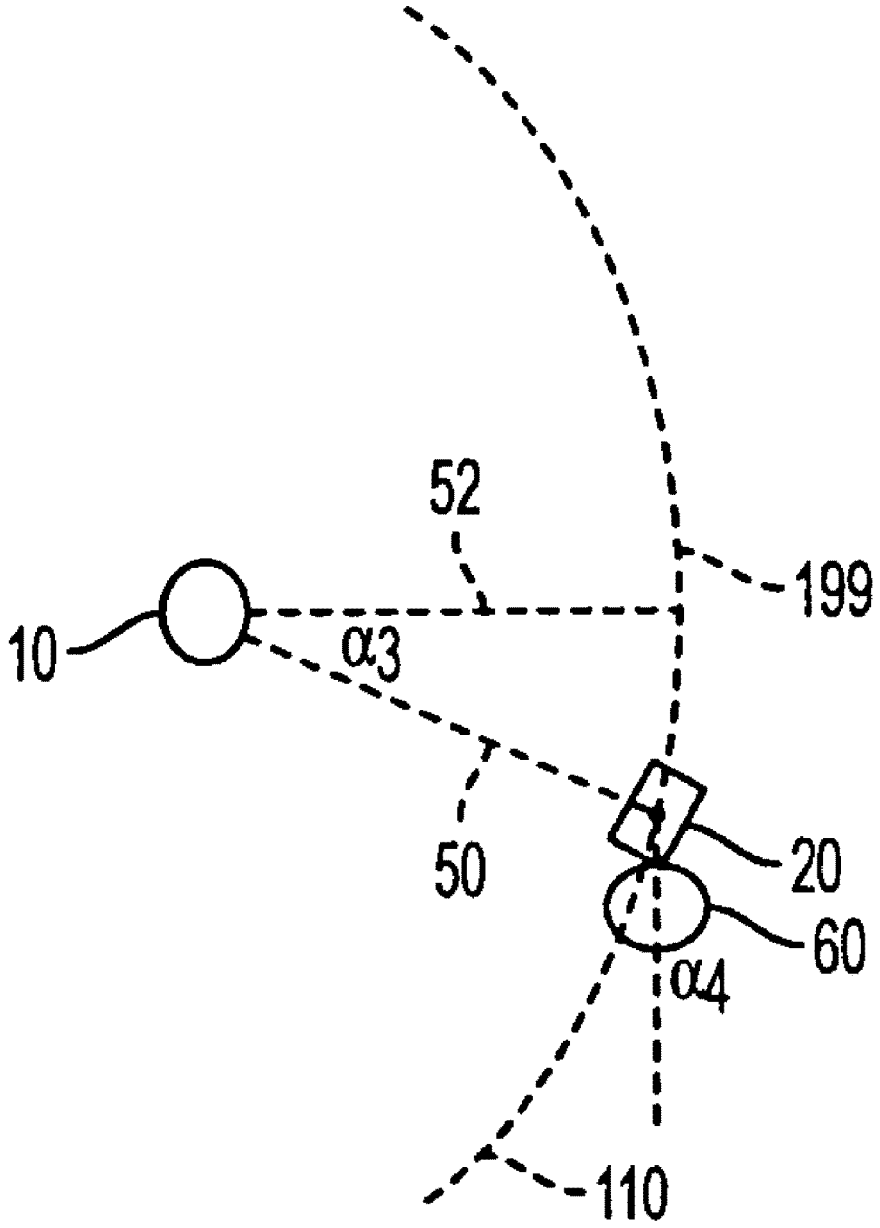
FIG. 9A represents the portable electronic device to the right the vertical axis of view position on the horizontal Javal arc of motion as applied to the present invention.
Figure 9B:
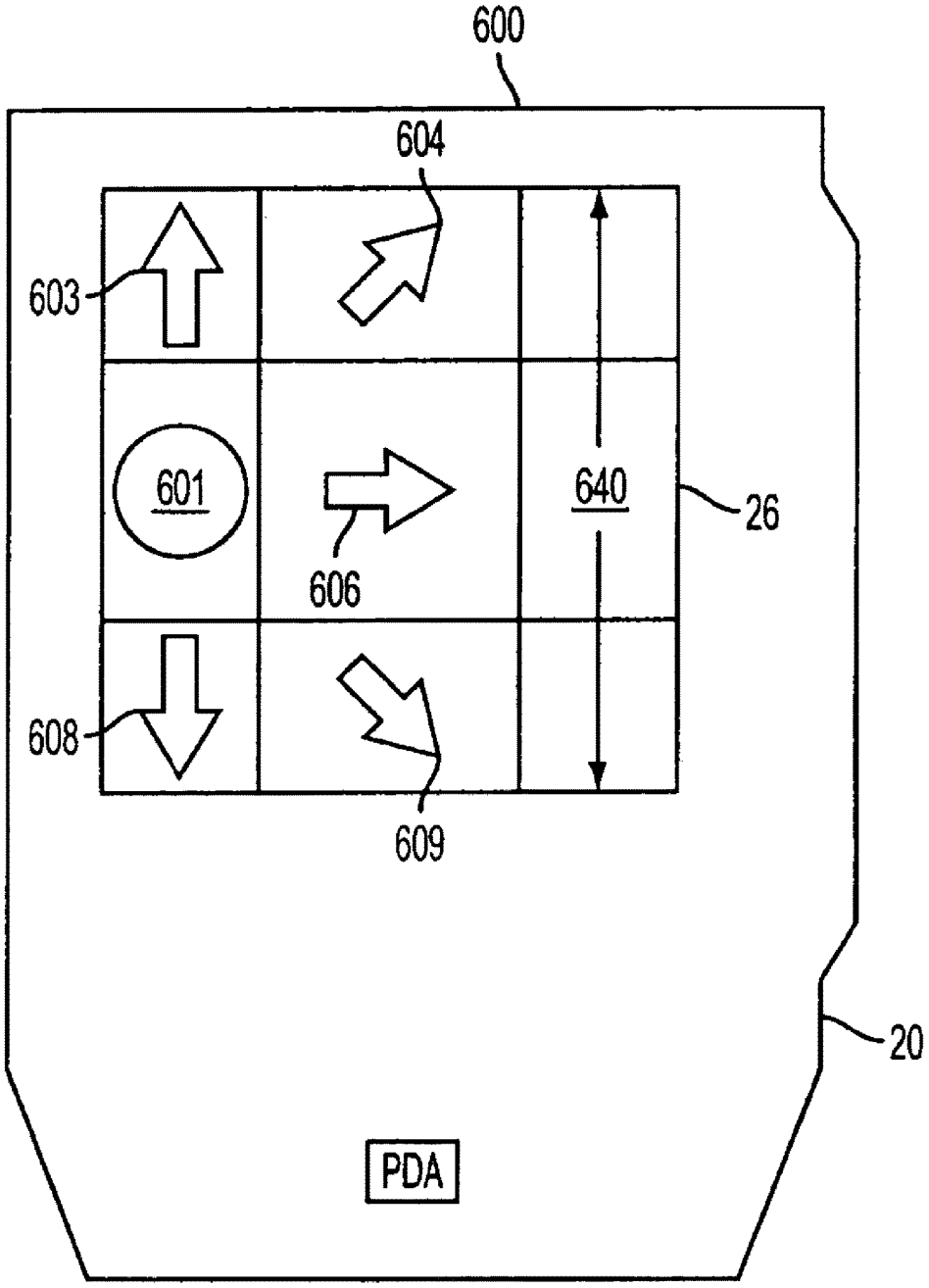
FIG. 9B represents the screen of a sample PDA at position in FIG. 9A.
Figure 9C:
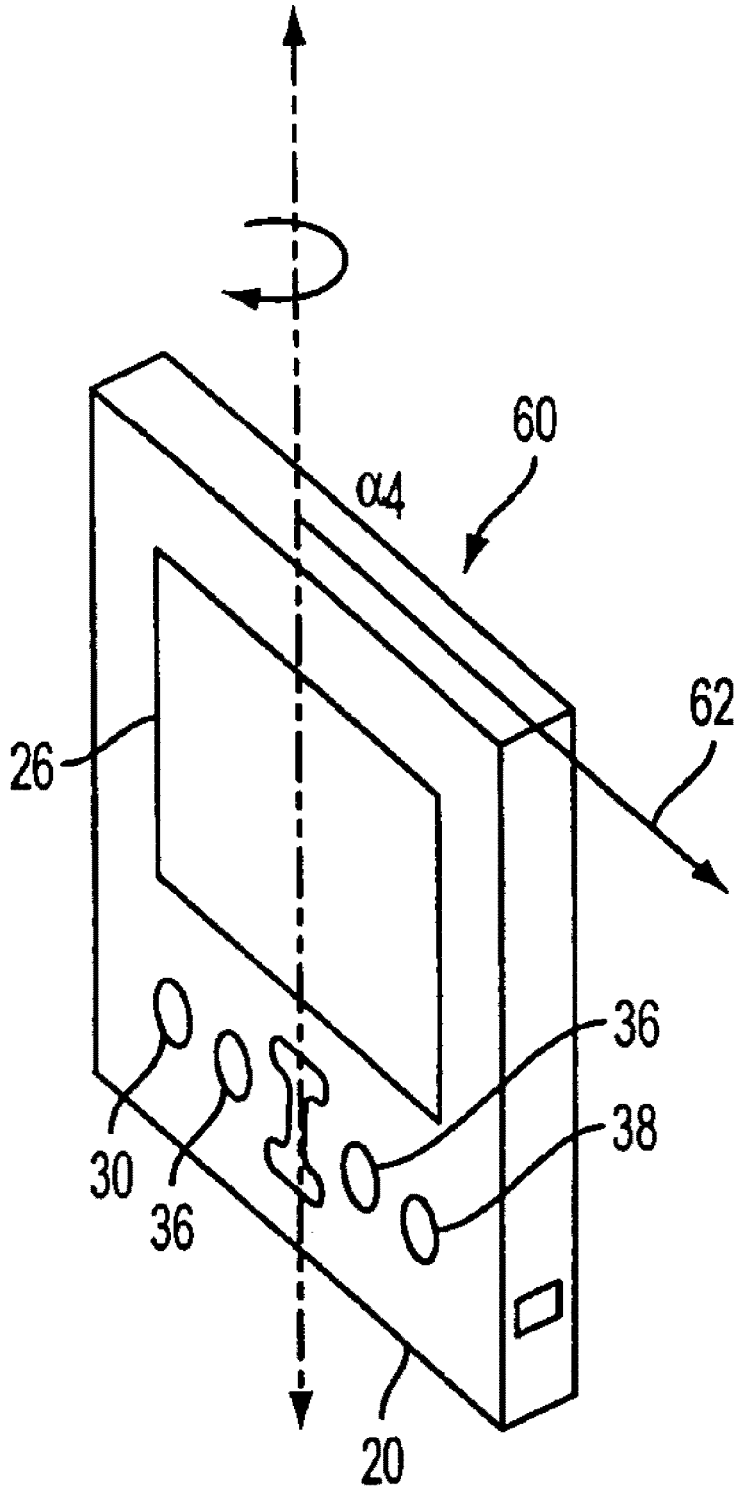
FIG. 9C represents a perspective view of the PDA of FIGS. 9A-9B.
Figure 10A:
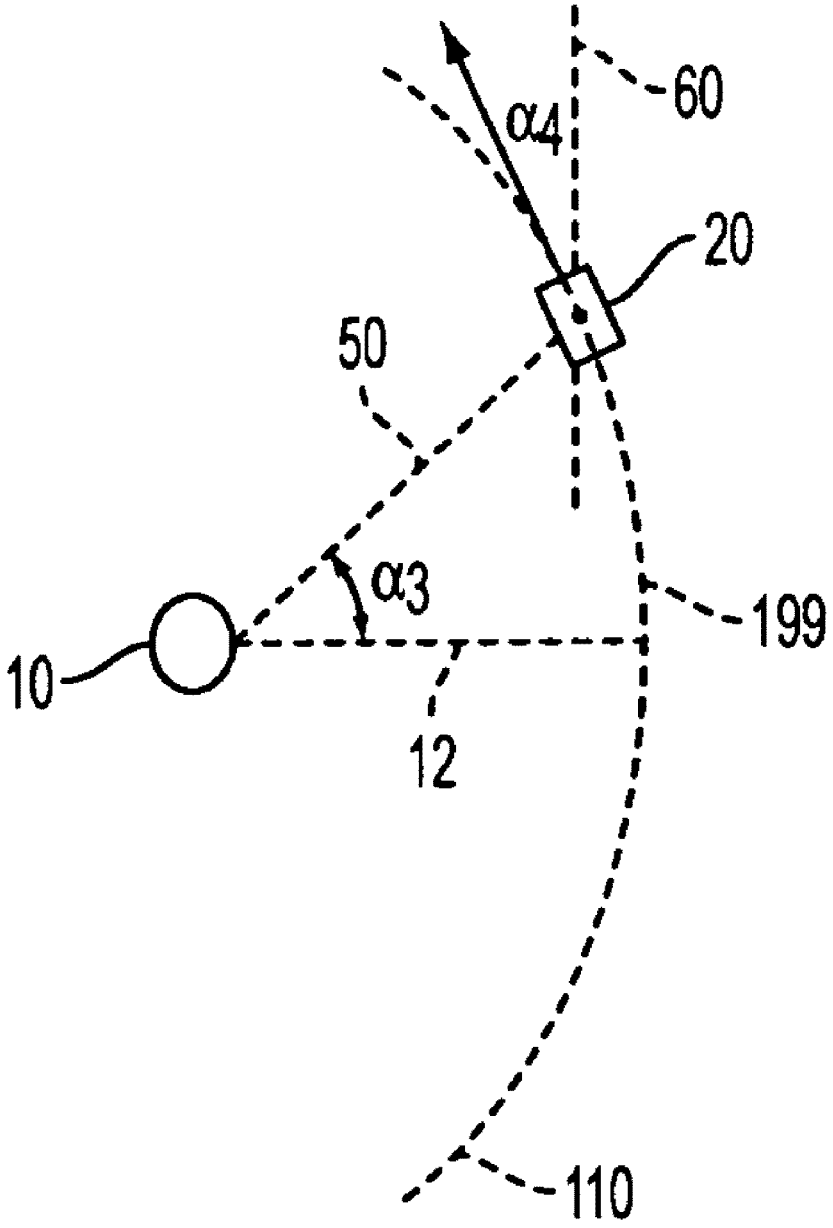
FIG. 10A represents the portable electronic device to the left the vertical axis of view position on the horizontal Javal arc of motion as applied to the present invention.
Figure 10B:
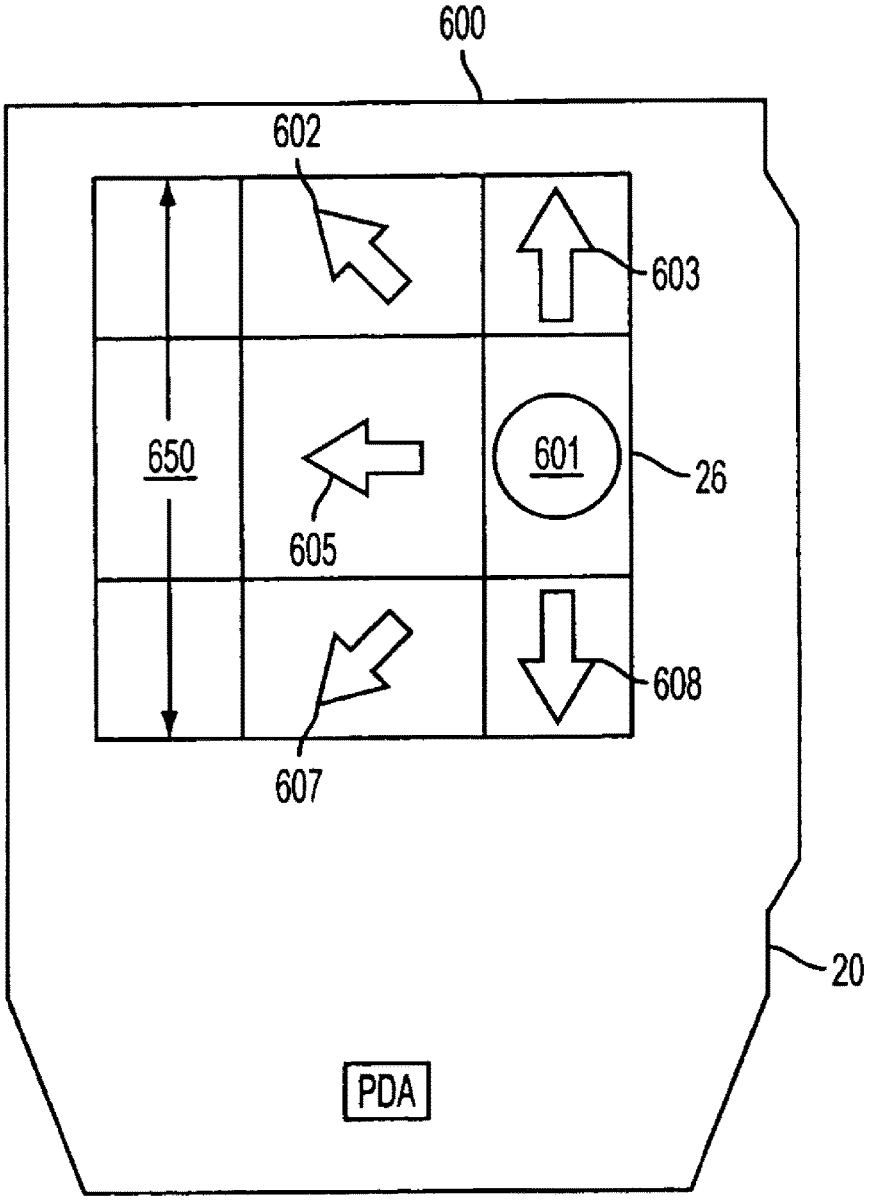
FIG. 10B represents the screen of a sample PDA at position in FIG. 10A.
Figure 11A:
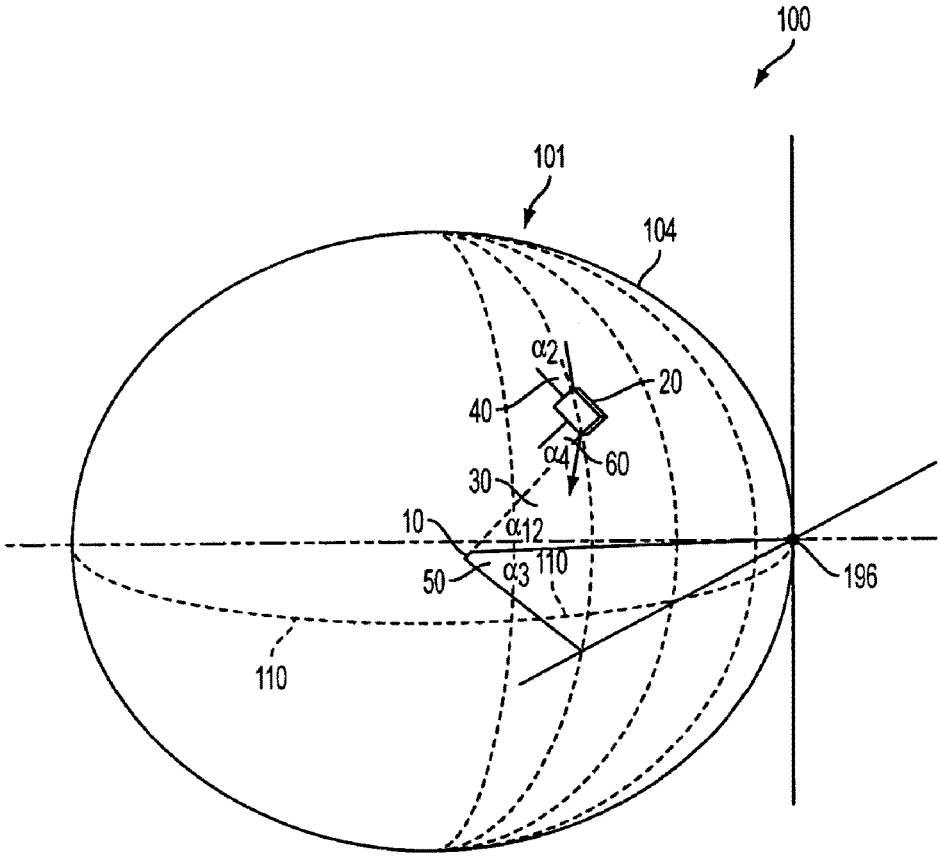
FIG. 11A represents the portable electronic device to the left the vertical axis of view position on the horizontal Javal arc of motion as applied to the present invention.
Figure 11B:
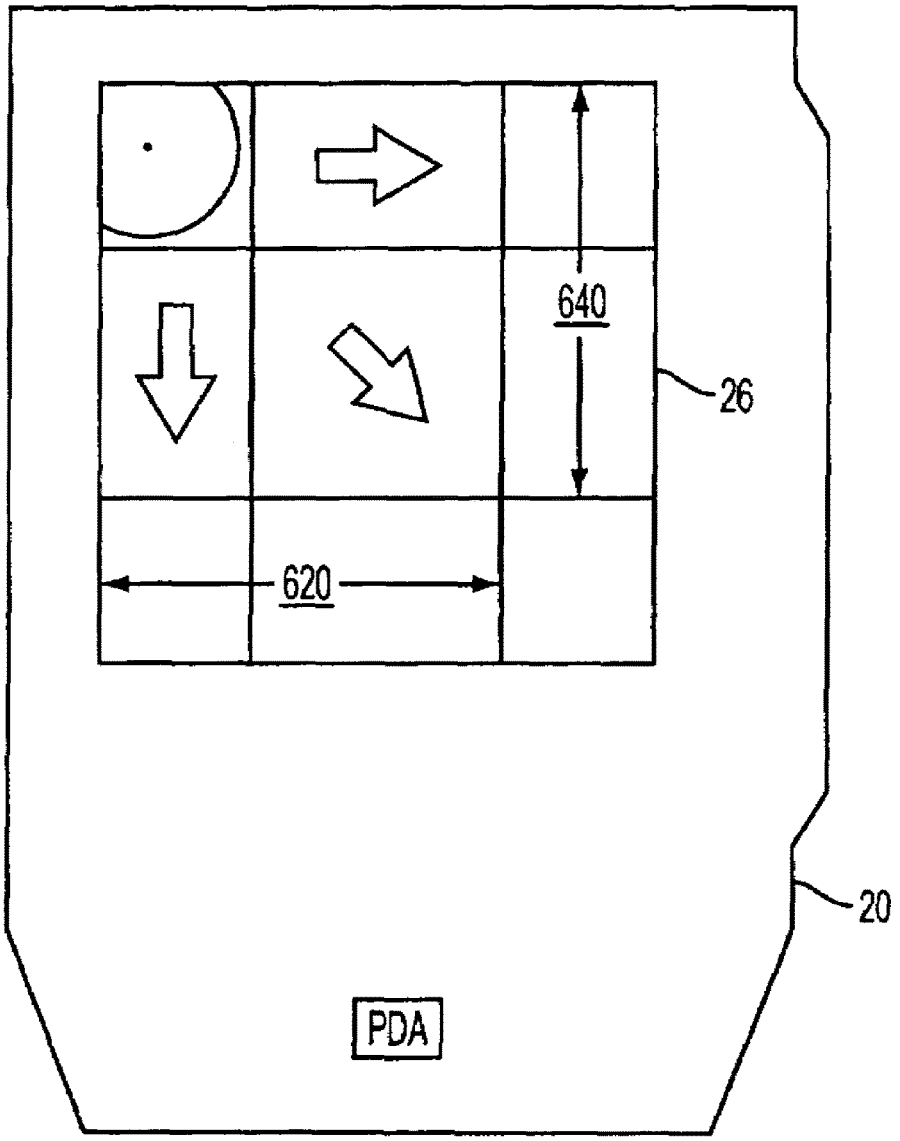
FIG. 11B represents the screen of a sample PDA at position in FIG. 11A.

FIGS. 9A-B, and FIGS. 10A-B represent the horizontal movement of the device to the right and left of the vertical normal of the user's line of sight respectively comprising angle α(3) 50 along the horizontal Javal arc 110. FIG. 9B shows a region in content screen 600 to the user's right 640 and FIG. 10B shows a region to the user's right 650 on the content screen 600. FIG. 11A represents a motion to both the right and above the respective vertical and horizontal axis which resulting in the display of the content screen 600 as shown in FIG. 11B and is located on the surface of the Javal spheroid 101. FIG. 9C is the representation of the α(4) 60 of the display device 20 to it normal horizontal axis 62 corresponding to the movement of the device 20 along the arc 110 in FIG. 9A.

Figure 12:
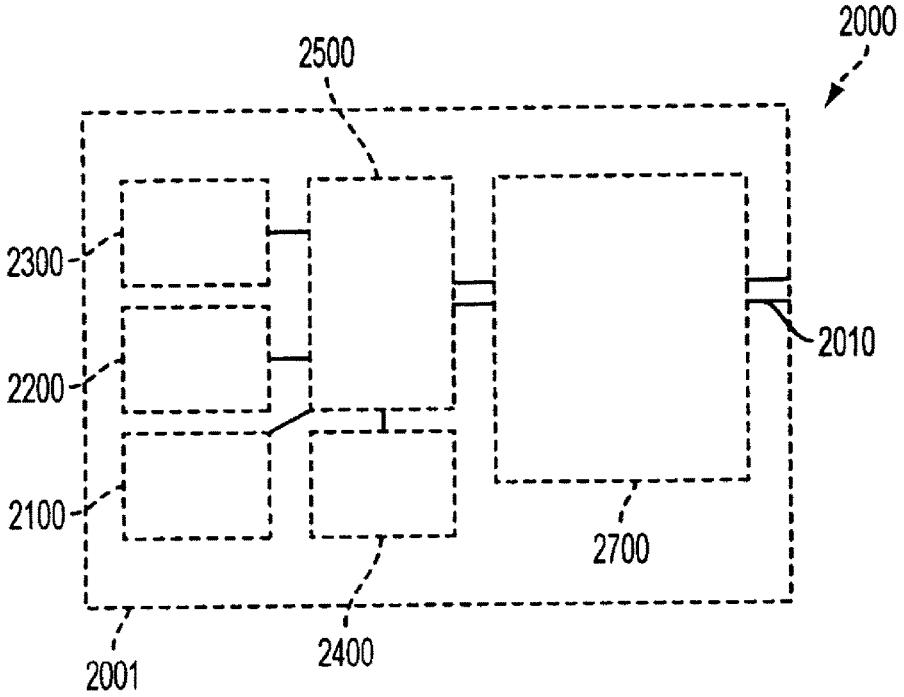
FIG. 12 is the representative diagram of the motion and position logic in a preferred embodiment of the invention.

The invention includes logic means 2000, which is shown in FIG. 12 herein, for calculating the distance the device has moved from a previous locations or orientation. Such logic 2000 may be hardwire into a physical Application Specific Integrated Circuit (ASIC) 2001, but is more like calculated on a distributed system where the commands can be activated reprogrammed by the hardware in the portable electronic device 20. Logic means includes an accelerometer input 2100, a first magnetometer input 2200 a second magnetometer input 2300, an optional fourth motion detection input 2400, a virtual motion calculation unit 2500, and a display control signal unit 2700.

Because accelerometers can effectively measure motion in one direction without integration, that one direction can be easily calculated, especially in the accelerometers most sensitive mode which is vertical because of the measure of gravity. Normally, to detect the motion in two directions, two accelerometers can be placed on a device, but this requires a great deal of integration which leads to enormous inaccuracies. In the present invention, the single accelerometer 1002 will measure the vertical movement or position of the portable electronic device 20.

Magnetometers can also easily measure the angle of the device 20 relative to its normal orientation as depicted in FIGS. 7C, 8C and 9C. Thus, in the above figures α(2) 40 and α(4) 60 can be easily measured from the vertical 42 and horizontal 62 orientations of the device 20. From the magnetometers 1004 and 1006 and the calculations of α(1) 30 and α(3) 50 made respectively as the distance traveled along Javals arcs 104 and 110. For example, a reasonably priced magnetometer 1004 can generally measure a few nanoTeslas (nT) of magnetic field changes. These magnetometers can therefore measure changes on the order of centimeters. The magnetometer can therefore measure an angle of device relative to its normal axis 42 due to change in magnetic field orientation. There are a variety of reasonable priced magnetometers available to consumers and the use of particular magnetometers may vary based on manufacturing requirements of the device 20, but constitute thin film magnetometers in a preferred embodiment in the present invention. The operation of such magnetometers is well know to those skilled in the art and will not discussed here.

The resulting voltage inputs to 2200 and 2300 from the magnetometers calculations of the changes in the magnetic field H, generally means that each axis of sensitivity of both H(x) and H(y) will have to be determined from H(⊥) and H(//) based on the angles α(2) 40 and α(4) 60 from the axes. The formula for the determination of the resulting voltage signal output into the inputs 2200 and 2300 is included herein.

The voltage signals from the changes in the respective magnetic fields H(x) and H(y) and which are detected by the magnetometers 1004 and 1006, are compiled with the output from the accelerometer 1002 and then compiled in the motion calculation unit 2500 based on the formulas described herein. It should be noted that the entire motion detection logic and control system 2000 is virtual, and any one of the components of the system may be located at any place through out the hardware of the device 20. For example, the accelerometer input unit 2100 may actually be located on the accelerometer 1002 instead of in the ASIC 2001 or in a discrete location in the distributed system alternative. The logic of the motion calculation unit 2500 for determining the motion and position of the device of is based on formulas disclosed herein.

One method for calculating position and distance traveled along the Javal spheroid 101 is the instantaneous velocity of an origin point 2 on the electronic device 20 is defined as: $V(x)=R*d\alpha(1)/dt$; $V(y)=R*\sin\alpha(1)*d\alpha(2)/dt$ in the "portrait" orientation, and $V(x)=R*d\alpha(4)/dt$; $V(y)=R*\sin\alpha(1)*d\alpha(3)/dt$ in the "landscape" orientation. Although this requires the conversion of coordinates based on the changing coordinate systems, the conversion of the Cartesian coordinates to Spherical coordinates in well known to those skilled in the art and is described in appendix A in the additional disclosure of the invention.

Figure 13:
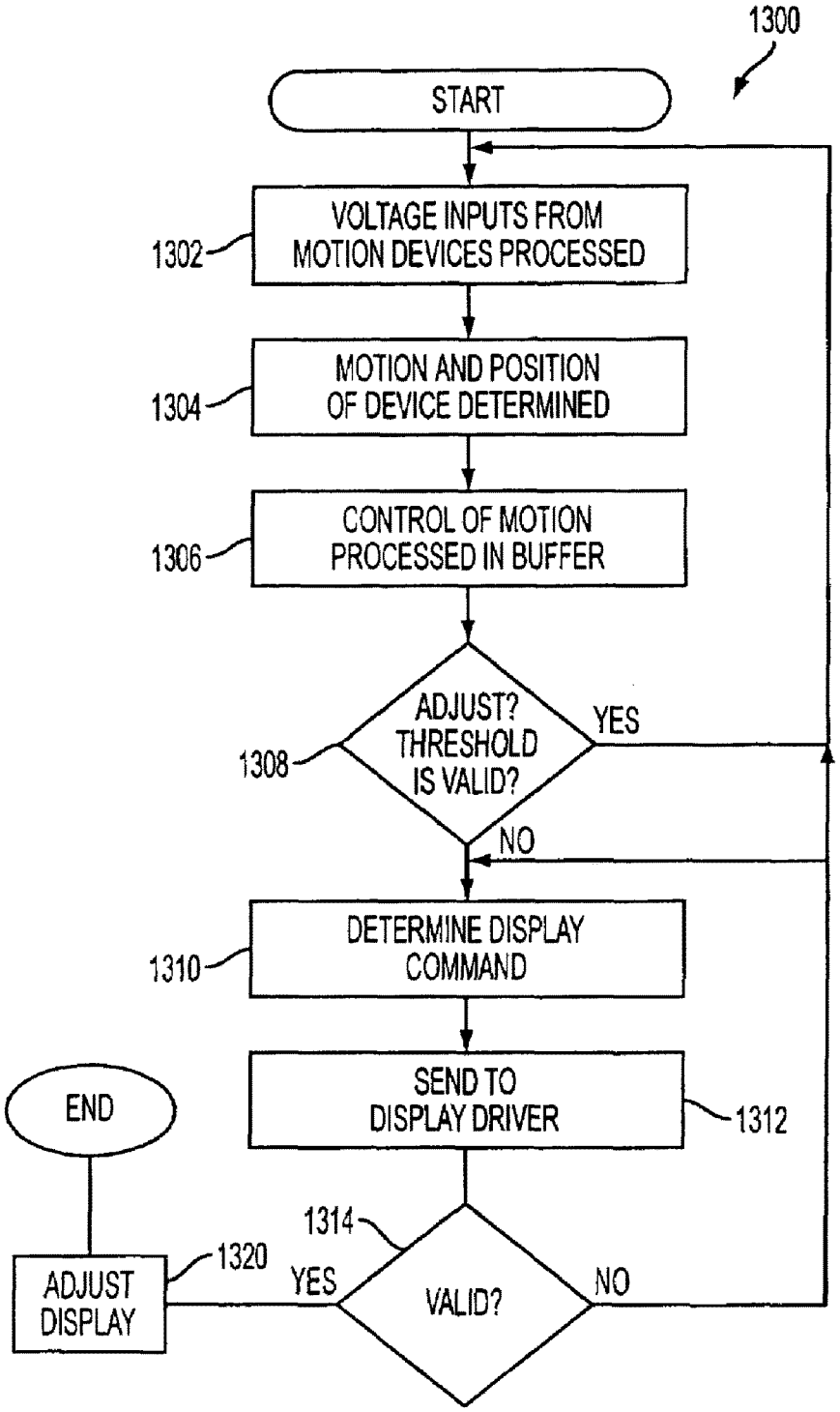
FIG. 13 is the method by which the movement of the display on the portable electronic device is calculated in the control unit.

Referring now to FIG. 13, a method for controlling a portable device with a display by the use of intuitive movements along a Javal spheroid 101 is shown. In step 1302, the user activates the Javal arc movement control modes by one of several different methods and a voltage output from the accelerometer 1002 and the magnetometers 1004 and 1006 is sent to their respective virtual processors 2100, 2200 and 2300 in the motion control logic 2000. In step 1304, the motion and position of the device is determined by the motion calculation unit 2500. This process described in greater detail below. The motion of the device is determined and then sent to the display control unit 2700 in step 1306. The display control unit 2700 determines what the particular motion or position of the device means for the control of the display in step 1306, and in step 1308 will test for validity (if the motion indicates any kind of control at all) or if more input from the motion sensors 1002 1004 1006 needs to take place before change in the display will result. If more information is needed the control unit 2700 returns to step 1302 for further input. If not the particular display command (scroll up 20 pixels, pan left 50 pixels, etc.) is chosen by the display control unit 2700 in step 1310. In step 1312 the command is sent to the display driver, which may included the virtual display 99 rendered in the display buffer 501. If the command is valid in step 1314, the command is performed in step 1320, but if the command is not valid (for example the display has panned as far left as it can go) then the process returns to step 1310 or 1302 for another command.

Depending on the user preferences, the movement and position of the device can be programmed to control the display differently. For example a user may wish to have the upward movement along the vertical Javal arc 104 to have the PDA content screen 600 to pan downward. Other users may wish to have such movement pan upward in an alternate embodiment.

In other preferred embodiments, means for detecting the distance a user 10 is away from the device may include echo location functions, light intensity functions. Zooming functions may be activated in different ways depending on the efficiency of manufacture. Other useful features of the invention may include such embodiments which include (1) threshold control for the elimination of the movement "noise;" (2) threshold control for the activation of the display control mechanism, (3) alternate display controls, such as horizontal movement is a display vertical scroll and vice versa; (4) lock and unlock controls of the arc movement navigation (where the horizontal is locked, but the vertical continues to scroll) and other useful navigation features.

Figure 14:
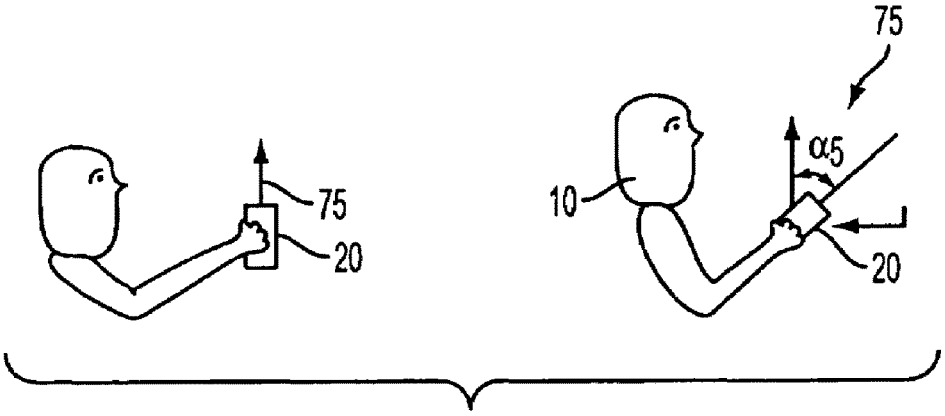
FIG. 14 is an alternate method for calculating movement and position in an embodiment of the present invention with regard to the zoom function.
Figure 15:
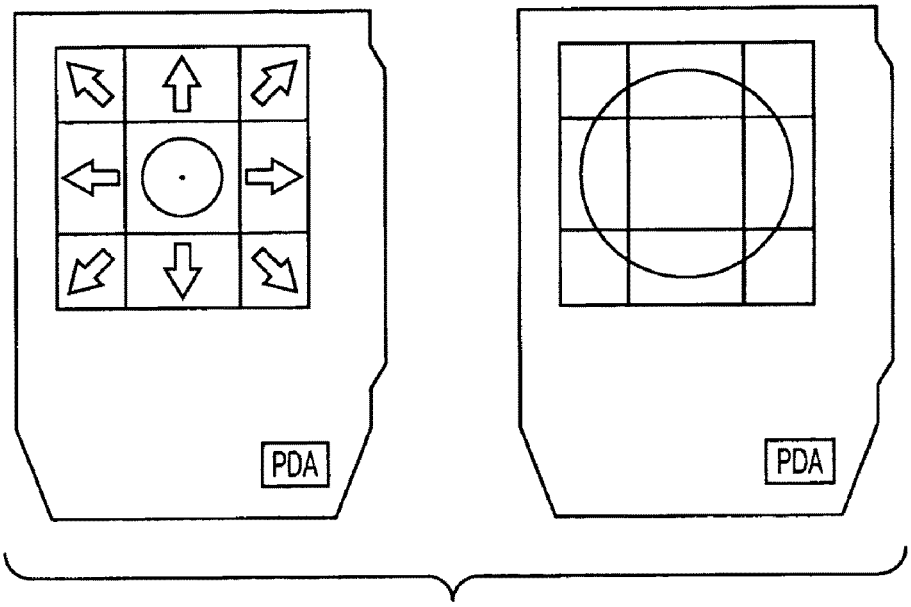
FIG. 15 is the resulting content screen for the method depicted in FIG. 14.

In another embodiment represented by FIG. 14, the invention uses the angle method for determining the users hand position, based upon some assumptions of human anatomy are used to determine the zoom control of the device 20. The user 10 is holding the PDA and wishing to enable the zoom-in and zoom-out functions. The user 10 release the navigation mode (it is possible to stay in navigation if it is latched-mode operation), and press the zoom button 38. Consider a user's 10 elbow to be in a fixed position against their side. The PDA 20 is moved in and out from the user's eyes. The angle of the PDA 20 changes from vertical to tilted angle $\alpha(5)$ 75. $\alpha(5)$ 75 can be used for scrolling. The difference is that now the new angle $\alpha(5)$ 75 is used to interpret this tilting as zoom-in and zoom-out which is an alternate to the because the zoom button method detailed above. This methodology has significant advantages: the same accelerometer 1002 is used, which takes advantage of gravity in its most sensitive mode of operation. It can be continuous, smooth zooming. There is no need for software incrementing, or jumping by steps, since continuous position information is being provided to the motion control unit 2500. The two positions in FIGS. 14(1) and (2) correspond to sample display content screens 600 in FIGS. 15(1) and (2).

*Appendix A*

When a user holding a PDA or smart phone device in his hand, moves it around while looking at the device display, the following assumptions apply:

1) The user will maintain the display at a distance that is constant. The distance can be adjusted to a comforatable reading distance. Assume that the comfortable reading distance is denoted by the value $R_{comf}$.
2) The user will maintain the display approximately normal to his line of sight.

These constraints define a situation in which the center of the display $O^1$ will move over the surface of its sphere, centered at the middle point of the segment joining the user's two eyes O, and of radius $R_{conf}$; with the display remaining tangent to the sphere at all times.

It can be assumed, without any loss of generality, a global frame of reference (O, X, Y, Z) so that $O_Z$ is vertical with the gravity vector oriented downward, and so that the Earth magnetic field $\vec{H}$ is in the $(O_X, O_Z)$ plane. One defines a device frame that $(O^1, X^{111}, Y^{111}, Z^{111})$ attached to the device display.

The device frame is related to the global frame by three successive rotations. A first rotation of the global frame around its $O_Z$ axis by angle $\Phi$ (the azimuth angle), defines the first intermediate frame $(O^1, X^1, Y^1, Z^1)$, with $Z^1=Z$. Then a rotation of the first intermediate frame around the $Y^1$ axis by an angle $\theta$ (the tilt angle), defines the second intermediate frame $(O^1, X^{11}, Y^{11}, Z^{11})$, with $Y^{11}=Y^1$. Finally a rotation of the second intermediate frame around the $Z^{11}$ axis by an angle $\gamma$ (the orientation angle), defines the device frame $(O^1, X^{111}, Y^{111}, Z^{111})$, with $Z^{111}=Z^{11}$.

$\gamma$=zero corresponds to a portrait orientation of the device, while $\gamma=\pi/2$ corresponds to a landscape orientation.

Assuming that the motion of the device in space is constrained as previously explained, the instantaneous velocity of $O^1$ in the global frame, projected along the base vectors of the device frame, is given by:

1) in portrait orientation:

$$\upsilon_{O'}^{X'''} = R_{conf}\frac{d\theta}{dt} \tag{1}$$

$$\upsilon_{O'}^{Y'''} = R_{conf}\,\mathrm{Sin}\theta\frac{d\phi}{dt} \tag{2}$$

2) in landscape orientation: $\gamma=\pm\pi/2$ $$\upsilon_{O'}^{X'''} = \pm R_{conf}\,\mathrm{Sin}\theta\frac{d\phi}{dt} \tag{3}$$

$$\upsilon_{O'}^{Y'''} = \pm R_{conf}\frac{d\theta}{dt} \tag{4}$$

From the previous equations it can be seen that the determination of the instantaneous velocity of $O^1$ has been reduced to the determination of the time derivatives of $\theta$ and $\Phi$.

Model of the Sensor Assembly:

In order to simplify the formulation of the problem, and without any significant loss of generality, one assumes that all the sensors are in the plane of the display (the $(O'_{X'''}, O'_{Y'''})$ plane).

One infers that:

$$\vec{\mu}_\alpha = \mathrm{Cos}\xi_\alpha\vec{\mu}_{X'''} + \mathrm{Sin}\xi_\alpha\vec{\mu}_{Y'''} \tag{5}$$

With the angle $\xi_\alpha$ assumed to be known (calibration).

And one has
$$\begin{pmatrix}\vec{\mu}_{X'}\\ \vec{\mu}_{Y'}\\ \vec{\mu}_{Z'}\end{pmatrix} = \begin{pmatrix}\mathrm{Cos}\phi & \mathrm{Sin}\phi & O\\ -\mathrm{Sin}\phi & \mathrm{Cos}\phi & O\\ O & O & 1\end{pmatrix}\begin{pmatrix}\vec{\mu}_{X}\\ \vec{\mu}_{Y}\\ \vec{\mu}_{Z}\end{pmatrix} \tag{6}$$

$$\begin{pmatrix}\vec{\mu}_{X''}\\ \vec{\mu}_{Y''}\\ \vec{\mu}_{Z''}\end{pmatrix} = \begin{pmatrix}\mathrm{Cos}\theta & O & -\mathrm{Sin}\phi\\ O & 1 & O\\ \mathrm{Sin}\theta & O & \mathrm{Cos}\theta\end{pmatrix}\begin{pmatrix}\vec{\mu}_{X'}\\ \vec{\mu}_{Y'}\\ \vec{\mu}_{Z'}\end{pmatrix} \tag{7}$$

$$\begin{pmatrix}\vec{\mu}_{X'''}\\ \vec{\mu}_{Y'''}\\ \vec{\mu}_{Z'''}\end{pmatrix} = \begin{pmatrix}\mathrm{Cos}\gamma & \mathrm{Sin}\gamma & O\\ -\mathrm{Sin}\gamma & \mathrm{Cos}\gamma & O\\ O & O & 1\end{pmatrix}\begin{pmatrix}\vec{\mu}_{X''}\\ \vec{\mu}_{Y''}\\ \vec{\mu}_{Z''}\end{pmatrix} \tag{8}$$

Tilt and Orientation Determination:

Assuming two accelerometers in the $(O'_{X'''}, O'_{Y'''})$ plane, with sensitivity axis $$\vec{\mu}_{\alpha 1}, \vec{\mu}_{\alpha 2};$$

one has:

$$\vec{\mu}_{\alpha 1} = \mathrm{Cos}\xi_{\alpha 1}\vec{\mu}_{X'''} + \mathrm{Sin}\xi_{\alpha 1}\vec{\mu}_{Y'''} \tag{9.1}$$

$$\vec{\mu}_{\alpha 2} = \mathrm{Cos}\xi_{\alpha 2}\vec{\mu}_{X'''} + \mathrm{Sin}\xi_{\alpha 2}\vec{\mu}_{Y'''} \tag{9.2}$$

And the output of these two sensors are given by:

$$V_{\alpha 1} = V_{\alpha 1}^0 + S_{\alpha 1}\vec{g}\cdot\vec{\mu}_{\alpha 1} \tag{10.1}$$

$$V_{\alpha 2} = V_{\alpha 2}^0 + S_{\alpha 2}\cdot\vec{\mu}_{\alpha 2} \tag{10.2}$$

Where the offset voltage $V_\alpha^O$ (in V), and the sensitivities $S_\alpha$ (in V $m^{-1}$, $\delta$), are assumed to be known (calibration).

From (10), one has:

$$\vec{g}\cdot\vec{\mu}_{\alpha 1} = \frac{V_{\alpha 1} - V_{\alpha 1}^O}{S_{\alpha 1}} \tag{11.1}$$

$$\vec{g}\cdot\vec{\mu}_{\alpha 2} = \frac{V_{\alpha 2} - V_{\alpha 2}^O}{S_{\alpha 2}} \tag{11.2}$$

From (9), one has:

$$\gamma_{\alpha 1} = \vec{g}\cdot\left(\mathrm{Cos}\xi_{\alpha 1}\vec{\mu}_{X'''} + \mathrm{Sin}\xi_{\alpha 1}\vec{\mu}_{Y'''}\right) \tag{12.1}$$

$$\gamma_{\alpha 2} = \vec{g}\cdot\left(\mathrm{Cos}\xi_{\alpha 2}\vec{\mu}_{X'''} + \mathrm{Sin}\xi_{\alpha 2}\vec{\mu}_{Y'''}\right) \tag{12.2}$$

i.e., $$\mathrm{Cos}\xi_{\alpha 1}\left(\vec{g}\vec{\mu}_{X'''}\right) + \mathrm{Sin}\xi_{\alpha 1}\left(\vec{g}\vec{\mu}_{Y'''}\right) = \gamma_{\alpha 1}$$

$$\mathrm{Cos}\xi_{\alpha 2}\left(\vec{g}\vec{\mu}_{X'''}\right) + \mathrm{Sin}\xi_{\alpha 2}\left(\vec{g}\vec{\mu}_{Y'''}\right) = \gamma_{\alpha 2}$$

i.e., $$\begin{pmatrix}\left(\vec{g}\vec{\mu}_{X'''}\right)\\ \left(\vec{g}\vec{\mu}_{Y'''}\right)\end{pmatrix} = \left(\bar{\bar{M}}^{-1}\right)\cdot\begin{pmatrix}\gamma_{\alpha 1}\\ \gamma_{\alpha 2}\end{pmatrix} \tag{13.1}$$

$$\bar{\bar{M}}\cdot = \begin{pmatrix}\mathrm{Cos}\xi_{\alpha 1} & \mathrm{Sin}\xi_{\alpha 1}\\ \mathrm{Cos}\xi_{\alpha 2} & \mathrm{Sin}\xi_{\alpha 2}\end{pmatrix} \tag{13.2}$$

One introduces:

$$\gamma X''' = \vec{g}\vec{\mu}_{X'''} \tag{14}$$

$$\gamma Y''' = \vec{g}\vec{\mu}_{Y'''}$$

From (7) and (8), one has:

$$\vec{\mu}_{X'''} = \mathrm{Cos}\gamma\vec{\mu}_{X''} + \mathrm{Sin}\gamma\vec{\mu}_{Y''} \tag{15}$$

$$\vec{\mu}_{Y'''} = -\mathrm{Sin}\gamma\vec{\mu}_{X''} + \mathrm{Cos}\gamma\vec{\mu}_{Y''}$$

$$\vec{\mu}_{X''} = \mathrm{Cos}\theta\vec{\mu}_{X'}\,\mathrm{Sin}\theta\vec{\mu}_{Z'}$$

$$\vec{\mu}_{Y''} = \vec{\mu}_{Y'}$$

$$\text{and } \vec{g} = -\vec{\mu}_{Z'} \tag{17}$$

$$\gamma X''' = +g\mathrm{Cos}\gamma\mathrm{Sin}\theta \tag{18.1}$$

-continued $$\gamma Y''' = -g\mathrm{Sin}\gamma\mathrm{Sin}\theta \tag{18.2}$$

i.e., $$\frac{\gamma_{X'''}}{g} = +\mathrm{Cos}\gamma\mathrm{Sin}\theta \tag{19.1}$$

$$\frac{\gamma_{Y'''}}{g} = -\mathrm{Sin}\gamma\mathrm{Sin}\theta \tag{19.2}$$

i.e., $$\left(\frac{\gamma_{X'''}}{g}\right)^2 + \left(\frac{\gamma_{Y'''}}{g}\right)^2 = \mathrm{Sin}^2\theta \tag{20}$$

i.e., $$\mathrm{Sin}\theta = \left[\left(\frac{\gamma_{X'''}}{g}\right)^2 + \left(\frac{\gamma_{Y'''}}{g}\right)^2\right]^{1/2} \tag{21}$$

As by definition $$0 \text{ is} < \theta < \frac{\pi}{2}$$

and $$\mathrm{Cos}\gamma = \frac{\left(\frac{\gamma_{X'''}}{g}\right)}{\left[\left(\frac{\gamma_{X'''}}{g}\right)^2 + \left(\frac{\gamma_{Y'''}}{g}\right)^2\right]^{\frac{1}{2}}} \tag{22.1}$$

$$\mathrm{Sin}\gamma = \frac{\left(\frac{\gamma_{Y'''}}{g}\right)}{\left[\left(\frac{\gamma_{X'''}}{g}\right)^2 + \left(\frac{\gamma_{Y'''}}{g}\right)^2\right]^{\frac{1}{2}}} \tag{22.2}$$

If $$\mathrm{Sin}\lambda| \leq \frac{\sqrt{2}}{2}$$

for portrait orientation $$|\mathrm{Sin}\gamma| \geq \frac{\sqrt{2}}{2}$$

for landscape orientation with $\epsilon$=Sig (Sin $\gamma$)

Azimuth Determination:

One has the in-plane component of the local magnetic field given by:

$$\vec{H}_{//} = (H_{poc}\mathrm{Cos}\delta)\vec{\mu}_X \tag{23}$$

Where the amplitude $H_{poc}$ and the inclination angle $\delta$ may be slowly varying functions off position and time.

And the perpendicular component:

$$\vec{H}_{\perp} = (-H_{poc}\mathrm{Sin}\delta)\vec{\mu}_Z \tag{24}$$

Assuming two magnometers in the ($O'_{X'''}$, $O'_{Y'''}$) plane, with sensitivity axis $$\vec{\mu}_{M1}$$

and $$\vec{\mu}_{M2},$$

one has:

$$\vec{\mu}_{M1} = \mathrm{Cos}\xi M1\vec{\mu}_{X'''} + \mathrm{Sin}\xi M1\vec{\mu}_{Y'''} \tag{25.1}$$

$$\vec{\mu}_{M2} = \mathrm{Cos}\xi M1\vec{\mu}_{X'''} + \mathrm{Sin}\xi M2\vec{\mu}_{Y'''} \tag{25.2}$$

And the output of these two sensors are given by:

$$V_{M1} = V^O_{M1} + S_{M1}\left\{\vec{H}_{//}\cdot\vec{\mu}_{M1} + \vec{H}_{\perp}\cdot\vec{\mu}_{M1}\right\} \tag{26.1}$$

$$V_{M2} = V^O_{M2} + S_{M2}\left\{\vec{H}_{//}\cdot\vec{\mu}_{M2} + \vec{H}_{\perp}\cdot\vec{\mu}_{M2}\right\} \tag{26.2}$$

Where the offset voltage $V^O_{\alpha}$ (in V), and the sensitivities $S_{\alpha}$ (in $V\cdot O_e^{-1}$) are assumed to be known (calibration).

From (26), one has:

$$\vec{H}_{//}\cdot\vec{\mu}_{M1} + \vec{H}_{\perp}\cdot\vec{\mu}_{M1} = \frac{V_{M1} - V^O_{M1}}{S_{M1}} \tag{27.1}$$

$$\vec{H}_{//}\cdot\vec{\mu}_{M2} + \vec{H}_{\perp}\cdot\vec{\mu}_{M2} = \frac{V_{M2} - V^O_{M2}}{S_{M2}} \tag{27.2}$$

i.e., from (15), one has:

$$\mathrm{Cos}\xi_{M1}\left(\vec{H}_{//} + \vec{H}_{\perp}\right)\vec{\mu}_{X'''} + \mathrm{Sin}\xi_{M1}\left(\vec{H}_{//} + \vec{H}_{\perp}\right)\vec{\mu}_{Y'''} = \frac{V_{M1} - V^O_{M1}}{S_{M1}}$$

$$\mathrm{Cos}\xi_{M2}\left(\vec{H}_{//} + \vec{H}_{\perp}\right)\vec{\mu}_{X'''} + \mathrm{Sin}\xi_{M2}\left(\vec{H}_{//} + \vec{H}_{\perp}\right)\vec{\mu}_{Y'''} = \frac{V_{M2} - V^O_{M2}}{S_{M2}}$$

i.e., $$\begin{bmatrix} (\vec{H}_{ll}+\vec{H}_{\perp})\cdot\vec{\mu}_{X'''} \\ (\vec{H}_{ll}+\vec{H}_{\perp})\cdot\vec{\mu}_{Y'''} \end{bmatrix} = (\overline{M}^{-1})\begin{pmatrix} \dfrac{V_{M1}-V^0_{M1}}{S_{M1}} \\ \dfrac{V_{M2}-V^0_{M2}}{S_{M2}} \end{pmatrix} \tag{28}$$

$$\overline{H}\cdot = \begin{pmatrix} \mathrm{Cos}\xi_{M1} & \mathrm{Sin}\xi_{M1} \\ \mathrm{Cos}\xi_{M2} & \mathrm{Sin}\xi_{M2} \end{pmatrix} \tag{29}$$

$$h_{X'''} = (\vec{H}_{ll}+\vec{H}_{\perp})\cdot\vec{\mu}_{X'''} \tag{30.1}$$

$$h_{Y'''} = (\vec{H}_{ll}+\vec{H}_{\perp})\cdot\vec{\mu}_{Y'''} \tag{30.2}$$

For (6), (7) and (8), one has:

$$\begin{aligned}\vec{\mu}_{X'''} &= \mathrm{Cos}\gamma\mathrm{Cos}\theta\mathrm{Cos}\Phi\vec{\mu}_X + \\ &\mathrm{Cos}\gamma\mathrm{Cos}\theta\mathrm{Sin}\Phi\vec{\mu}_Y\mathrm{Cos}\gamma\mathrm{Sin}\theta\vec{\mu}_Z - \mathrm{Sin}\gamma\mathrm{Sin}\Phi\vec{\mu}_X + \mathrm{Sin}\gamma\mathrm{Cos}\Phi\vec{\mu}_Y = \\ &(\mathrm{Cos}\gamma\mathrm{Cos}\theta\mathrm{Cos}\Phi - \mathrm{Sin}\gamma\mathrm{Sin}\Phi)\vec{\mu}_X + A\vec{\mu}_Y - \mathrm{Cos}\gamma\mathrm{Sin}\theta\vec{\mu}_Z\end{aligned} \tag{31.1}$$

$$\vec{\mu}_{Y'''} = (\mathrm{Sin}\gamma\mathrm{Cos}\theta\mathrm{Cos}\Phi - \mathrm{Cos}\gamma\mathrm{Sin}\Phi)\vec{\mu}_X + B\vec{\mu}_Y - \mathrm{Sin}\gamma\mathrm{Sin}\theta\vec{\mu}_Z \tag{31.2}$$

i.e., $$h_{X'''} = H_{//}(\mathrm{Cos}\gamma\mathrm{Cos}\theta\mathrm{Cos}\Phi - \mathrm{Sin}\gamma\mathrm{Sin}\Phi) - H_{\perp}\mathrm{Cos}\gamma\mathrm{Sin}\theta \tag{32.1}$$

$$h_{y'''} = H_{//}(\mathrm{Sin}\gamma\mathrm{Cos}\theta\mathrm{Cos}\Phi - \mathrm{Cos}\gamma\mathrm{Sin}\Phi) + H_{\perp}\mathrm{Sin}\gamma\mathrm{Sin}\theta \tag{32.2}$$

Sin θ is known from (21):

$$\mathrm{Sin}\theta = \left[\left(\frac{\gamma_{X'''}}{g}\right)^2 + \left(\frac{\gamma_{Y'''}}{g}\right)^2\right]^{\frac{1}{2}} \tag{33}$$

Therefore $\mathrm{Cos}\theta = \epsilon(1-\mathrm{Sin}^2\theta)^{1/2}$

And Sin γ and Cos γ are known from (19):

$$\mathrm{Sin}\gamma = \left(\frac{\gamma_{Y'''}}{g}\right)\frac{1}{\mathrm{Sin}\theta} \tag{36.1}$$

$$\mathrm{Cos}\gamma = \left(\frac{\gamma_{X'''}}{g}\right)\frac{1}{\mathrm{Sin}\theta} \tag{36.2}$$

Thus, $$\epsilon\ \mathrm{Cos}\ \gamma|\mathrm{Cos}\ \theta|(H_{//}\ \mathrm{Cos}\ \Phi)-\mathrm{Sin}\ \gamma(H_{//}\ \mathrm{Sin}\ \Phi)=[h_{x'''}-H_{\perp}\ \mathrm{Cos}\ \gamma\ \mathrm{Sin}\ \theta]$$

$$\epsilon\ \mathrm{Sin}\ \gamma|\mathrm{Cos}\ \theta|(H_{//}\ \mathrm{Cos}\ \Phi)-\mathrm{Cos}\ \gamma(H_{//}\ \mathrm{Sin}\ \Phi)=[h_{y'''}-H_{\perp}\ \mathrm{Sin}\ \gamma\ \mathrm{Sin}\ \theta]$$

i.e., $$h_{X'''}=\epsilon\ \mathrm{Cos}\ \gamma|\mathrm{Cos}\ \theta|(H_{//}\ \mathrm{Cos}\ \Phi)-\mathrm{Sin}\ \gamma(H_{//}\ \mathrm{Sin}\ \Phi)+H_{\perp}\ \mathrm{Cos}\ \gamma\ \mathrm{Sin}\ \theta \tag{35.1}$$

$$h_{Y'''}=\epsilon\ \mathrm{Sin}\ \gamma|\mathrm{Cos}\ \theta|(H_{//}\ \mathrm{Cos}\ \Phi)-\mathrm{Cos}\ \gamma(H_{//}\ \mathrm{Sin}\ \Phi)+H_{\perp}\ \mathrm{Sin}\ \gamma\ \mathrm{Sin}\ \theta \tag{35.2}$$

$$\mathrm{Sin}\ \gamma h_{X'''}-\mathrm{Cos}\ \gamma h_{Y'''}=2\epsilon\ \mathrm{Sin}\ \gamma\ \mathrm{Cos}\ \gamma|\mathrm{Cos}\ \theta|(H_{//}\ \mathrm{Cos}\ \Phi)-\mathrm{Cos}\ \gamma\ \mathrm{Sin}^2\ \gamma(H_{//}\ \mathrm{Sin}\ \Phi)$$

$$\mathrm{Sin}\ \gamma h_{X'''}+\mathrm{Cos}\ \gamma h_{Y'''}=-(H_{//}\ \mathrm{Sin}\ \Phi)+2H_{\perp}\ \mathrm{Sin}\ \gamma\ \mathrm{Cos}\ \gamma\ \mathrm{Sin}\ \Phi$$

i.e., $$2\epsilon\ \mathrm{Sin}\ \gamma\ \mathrm{Cos}\ \gamma|\mathrm{Cos}\ \theta|(H_{//}\ \mathrm{Cos}\ \Phi)+\mathrm{Cos}^2\ \gamma\ \mathrm{Sin}^2\ \gamma(H_{//}\ \mathrm{Sin}\ \Phi)=(\mathrm{Sin}\ \gamma h_{X'''}-\mathrm{Cos}\ \gamma h_{Y'''}) \tag{36.1}$$

$$(H_{//}\ \mathrm{Sin}\ \Phi)+(2\ \mathrm{Sin}\ \gamma\ \mathrm{Cos}\ \gamma\ \mathrm{Sin}\ \theta)H_{\perp}=(\mathrm{Sin}\ \gamma h_{X'''}+\mathrm{Cos}\ \gamma h_{Y'''}) \tag{36.2}$$

$$H_{\perp}=\epsilon_M(1-H_{//}^2)^{1/2} \tag{37}$$

Where $\epsilon_M$ is known (north or south of magnetic equator). Thus:

$$2\epsilon\ \mathrm{Sin}\ \gamma\ \mathrm{Cos}\ \gamma|\mathrm{Cos}\ \theta|(H_{//}\ \mathrm{Cos}\ \Phi)+(\mathrm{Cos}^2\ \gamma-\mathrm{Sin}^2\ \gamma)(H_{//}\ \mathrm{Sin}\ \Phi)=(\mathrm{Sin}\ \gamma h_{X'''}-\mathrm{Cos}\ \gamma h_{Y'''}) \tag{38.1}$$

$$(H_{//}\ \mathrm{Sin}\ \Phi)+\epsilon_M(\mathrm{Sin}\ \gamma\ \mathrm{Cos}\ \gamma\ \mathrm{Sin}\ \theta)(H_{poc}^2-H_{//}^2)^{1/2}=(\mathrm{Sin}\ \gamma h_{X'''}+\mathrm{Cos}\ \gamma h_{Y'''}) \tag{38.2}$$

If the magnetic inclination δ and the field amplitude $H_{poc}$ are assumed to be known:

$$H_{//}=H_{poc}\ \mathrm{Cos}\ \delta \tag{9.1}$$

$$H_{\perp}=H_{poc}\ \mathrm{Sin}\ \delta \tag{39.2}$$

$$[2H_{//}\ \mathrm{Sin}\ \gamma\ \mathrm{Cos}\ \gamma(\epsilon|\mathrm{Cos}\ \theta|)]\mathrm{Cos}\ \Phi+(\mathrm{Cos}^2\ \gamma-\mathrm{Sin}^2\ \gamma)(H_{//}\ \mathrm{Sin}\ \Phi)=(\mathrm{Sin}\ \gamma h_{X'''}-\mathrm{Cos}\ \gamma h_{Y'''}) \tag{40.1}$$

$$H_{//}\ \mathrm{Sin}\ \Phi+2(\mathrm{Sin}\ \gamma\ \mathrm{Cos}\ \gamma\ \mathrm{Sin}\ \theta)H_{\perp}=(\mathrm{Sin}\ \gamma h_{X'''}+\mathrm{Cos}\ \gamma h_{Y'''}) \tag{40.2}$$

i.e., $$H_{//}\ \mathrm{Sin}\ \Phi=2(\mathrm{Sin}\ \gamma\ \mathrm{Cos}\ \gamma\ \mathrm{Sin}\ \theta)H_{\perp}-(\mathrm{Sin}\ \gamma h_{X'''}+\mathrm{Cos}\ \gamma h_{Y'''}) \tag{41.1}$$

$$H_{ll}\mathrm{Cos}\Phi = \frac{(\mathrm{Sin}\gamma h_{X'''} - \mathrm{Cos}\gamma h_{Y'''}) - (\mathrm{Cos}^2\gamma - \mathrm{Sin}^2\gamma)H_{ll}\mathrm{Sin}\phi}{2\mathrm{Sin}\gamma\mathrm{Cos}\gamma(\varepsilon|\mathrm{Cos}\delta|)}$$

$\gamma\simeq 0$ then $H_{//}\ \mathrm{Sin}\ \Phi\simeq\mathrm{Cos}\ \gamma h_{Y'''}$ $$h_{X'''}\simeq\epsilon|\mathrm{Cos}\ \theta|(H_{//}\ \mathrm{Cos}\ \Phi)+H_{\perp}\ \mathrm{Sin}\ \theta$$

i.e., $$\epsilon|\mathrm{Cos}\ \theta|(H_{//}\ \mathrm{Cos}\ \Phi)\simeq(h_{X'''}-H_{\perp}\ \mathrm{Sin}\ \theta)$$

$$(\mathrm{Cos}\ \gamma h_{X'''}-\mathrm{Sin}\ \gamma h_{y'''})=\epsilon|\mathrm{Cos}\ \theta|(H_{//}\ \mathrm{Cos}\ \Phi)+(\mathrm{Cos}^2\ \gamma-\mathrm{Sin}^2\ \gamma)H_{\perp}\ \mathrm{Sin}\ \theta$$

$$(\mathrm{Sin}\ \gamma h_{X'''}+\mathrm{Cos}\ \gamma h_{y'''}=-(H_{//}\ \mathrm{Sin}\ \Phi)+2(\mathrm{Sin}\ \gamma\ \mathrm{Cos}\ \gamma)H_{\perp}\ \mathrm{Sin}\ \theta$$

i.e., $$\epsilon|\mathrm{Cos}\ \theta|(H_{//}\ \mathrm{Cos}\ \Phi)+(\mathrm{Cos}^2\ \gamma-\mathrm{Sin}^2\ \gamma)(H_{\perp}\ \mathrm{Sin}\ \Phi)=(\mathrm{Cos}\ \gamma h_{X'''}-\mathrm{Sin}\ \theta h_{y'''}) \tag{42.1}$$

$$-(H_{//}\ \mathrm{Sin}\ \Phi)+2(\mathrm{Sin}\ \gamma\ \mathrm{Cos}\ \gamma)(H_{\perp}\ \mathrm{Sin}\ \theta)=(\mathrm{Sin}\ \gamma h_{X'''}+\mathrm{Cos}\ \gamma h_{y'''}) \tag{42.2}$$

If γ=0, one has in first approximation:

$$\epsilon|\mathrm{Cos}\ \theta|(H_{//}\ \mathrm{Cos}\ \Phi)+(H_{\perp}\ \mathrm{Sin}\ \theta)=h_{x'''}$$

$$-H_{//}\ \mathrm{Sin}\ \Phi=h_{y'''}$$

i.e., $$\mathrm{Sin}\Phi = \left(\frac{h_{y'''}}{H_{ll}}\right) \tag{43.1}$$

-continued $$\mathrm{Cos}\Phi = \frac{h_x''' - H_\perp \mathrm{Sin}\theta}{|\mathrm{Cos}\theta| H_{\parallel}} \tag{43.2}$$

$$\text{assuming } \epsilon = -1\left(\theta > \frac{\pi}{2}\right) \tag{44.1}$$

$$H_{\parallel}^2 = (h_y''')^2 + \left(\frac{h_x''' - H_\perp \mathrm{Sin}\theta}{|\mathrm{Cos}\theta|}\right)^2$$

$$\mathrm{Sin}\phi = \left(\frac{-h_y'''}{H_{\parallel}}\right)$$

$$\mathrm{Cos}\phi = \frac{H_\perp \mathrm{Sin}\theta - h_x'''}{|\mathrm{Cos}\theta| H_{\parallel}} \tag{44.2}$$

$$\Delta \mathrm{Sin}\phi = \mathrm{Cos}\phi \Delta\phi = \Delta\left\{\frac{(-h_y''')}{H_{\parallel}}\right\} \tag{45.1}$$

$$\Delta \mathrm{Cos}\phi = \mathrm{Sin}\phi \Delta\phi = \Delta\left\{\frac{(H_\perp \mathrm{Sin}\theta - h_x''')}{|\mathrm{Cos}\theta| H_{\parallel}}\right\} \tag{45.2}$$

$$\mathrm{Cos}\phi \Delta \mathrm{Sin}\phi - \mathrm{Sin}\phi \Delta \mathrm{Cos}\phi = \Delta\phi = \left\{\frac{(H_\perp \mathrm{Sin}\theta - h_x''')}{|\mathrm{Cos}\theta| H_{\parallel}}\right\}\Delta\left\{\frac{(-h_y''')}{H_{\parallel}}\right\} + \left\{\frac{(-h_y''')}{H_{\parallel}}\right\}\Delta\left\{\frac{(H_\perp \mathrm{Sin}\theta - h_x''')}{|\mathrm{Cos}\theta| H_{\parallel}}\right\} \tag{46}$$

$$v_O^{y'''} = R_{conf}\left[\left(\frac{\gamma_x'''}{y}\right)^2 + \left(\frac{\gamma_y'''}{y}\right)^2\right]^{\frac{1}{2}} \frac{\Delta\phi}{\Delta t} \tag{47}$$

$$v_O^{x'''} = R_{conf}\Delta\theta = R_{conf}\frac{\Delta \mathrm{Sin}\theta}{(1-\sin^2\theta)^{\frac{1}{2}}\Delta t} \tag{48}$$

What is claimed is:

1. A method for controlling a display on a portable electronic device, the method comprising the computer-implemented acts of:

detecting *sensor data indicative of* a motion of said portable electronic device relative to a fixed point, wherein said motion follows a preferential motion arc that is natural to eye and/or hand coordination of *a* holder of said portable electronic device;

calculating a position *on a spheroid* of said portable electronic device based on *said sensor data indicative of* said motion that is relative to said fixed point;

calculating *said motion with respect to said spheroid given said sensor data indicative of said motion* and analyzing said *sensor data indicative of said* motion *with respect to said spheroid*;

*determining that said motion corresponds to a display command;* and adjusting said display based on said motion and on *an angle of* said position[, if] *on said spheroid in response to determining that* said motion corresponds to [a user] *said display* command, *said angle indicating an orientation of said portable electronic device relative to a line of sight of said holder*.

2. The method of claim 1, wherein [said act of] detecting said *sensor data indicative of said* motion further [comprising] *comprises*:

receiving input from motion sensors [which] *that* can detect *said sensor data indicative of* said motion of said portable electronic device.

3. The method of claim 1, wherein [said act of] calculating [a] *said* position *on said spheroid* is based on a Javal coordinate system.

4. The method of claim 1, wherein [said act of] calculating *said motion with respect to said spheroid* and analyzing said *sensor data indicative of said* motion [is] *are* based on a Javal arc coordinate system.

5. The method of claim 1, wherein [said act of] calculating *said motion with respect to said spheroid* and analyzing said *sensor data indicative of said* motion further comprises measuring changes in a magnetic field.

6. The method of claim 1, wherein [said act of] calculating *said motion with respect to said spheroid* and analyzing said *sensor data indicative of said* motion further comprises measuring one or more angles corresponding to [a] position of said portable electronic device relative to said fixed point.

[7. The method of claim 1, wherein said motion is modeled mathematically by a virtual surface of a virtual thin-walled shell that is approximately spherical in shape.]

[8. The method of claim 4, wherein an origin of said Javal arc is said fixed point.]

9. A controller for a display on a portable electronic device, the controller comprising:

at least one accelerometer for measuring a *sensor data indicative of a* motion of said portable electronic device *relative to a fixed point*, wherein said motion follows a preferential motion arc that is natural to eye and/or hand coordination of *a* holder of said portable electronic device;

at least one magnetic sensor for measuring said motion; [and]

logic for calculating said motion *with respect to a spheroid given said senor data indicative of said motion,* and for calculating a position *on said spheroid* of said portable electronic device based on one or more measurements from said at least one accelerometer and said at least one magnetic sensor*;*

*logic for determining that said motion corresponds to a display command; and*

*logic for adjusting said display based on said motion and on an angle of said position on said spheroid in response to determining that said motion corresponds to said display command, said angle indicating an orientation of said portable electronic device relative to a line of sight of said holder*.

10. The controller of claim 9, wherein said motion is modeled by a pre-defined path.

11. The controller of claim 9, wherein said motion is modeled by a Javal arc.

12. The controller of claim 9, wherein said motion is based on a Javal coordinate system.

13. A method for controlling a *portable electronic* device, the method comprising the computer-implemented acts of:

calculating [and analyzing] a motion of said *portable electronic* device *with respect to a spheroid given sensor data indicative of said motion with respect to said spheroid;*

*analyzing said sensor data indicative of said motion with respect to said spheroid;*

*calculating a position on said spheroid of said portable electronic device based on said sensor data indicative of said motion that is* relative to a fixed point from said *portable electronic* device, wherein said motion follows a preferential motion arc that is natural to eye and/or hand coordination of *a* holder of said portable electronic device; [and]

determining [if] *that* said motion corresponds to a [user] *display* command; *and* adjusting at least one aspect of a display on said *portable electronic* device based on said motion [when said motion corresponds to a user command] *and on an angle of said position on said spheroid in response to determining that said motion corresponds to said dis-*

*play command, said angle indicating an orientation of said portable electronic device relative to a line of sight of said holder.*

14. The method of claim 13, [wherein said acts of] calculating *said motion of said portable electronic device* and analyzing *said sensor data indicative of* said motion further [comprising] *comprises*:

receiving input from motion sensors [which] *that* can detect *said sensor data indicative of* said motion of said *portable electronic* device.

15. The method of claim 14, wherein said motion sensors are attached to said *portable electronic* device.

[16. The method of claim 13, further comprising:

calculating a position of said device based on said motion that is relative to said fixed point.]

17. A controller for a display on a portable electronic device, the controller comprising:

*only* two accelerometers for measuring *sensor data indicative of* a motion of said portable electronic device *relative to a fixed point*, wherein said motion follows a preferential motion arc that is natural to eye and/or hand coordination of *a* holder of said portable electronic device;

at least one magnetic sensor for measuring said motion; [and]

logic for calculating said motion *with respect to a spheroid given said sensor data indicative of said motion,* and for calculating a position *on said spheroid* of said portable electronic device based on one or more measurements from said *only* two accelerometers and said at least one magnetic sensor*;*

*logic for determining that said motion corresponds to a display command; and*

*logic for adjusting said display based on said motion and on an angle of said position on said spheroid in response to determining that said motion corresponds to said display command, said angle indicating an orientation of said portable electronic device relative to a line of sight of said holder.*

18. A controller for a display on a portable electronic device, the controller comprising:

one gyroscope for measuring *sensor data indicative of* a motion of said portable electronic device *relative to a fixed point*, wherein said motion follows a preferential motion arc that is natural to eye and/or hand coordination of *a* holder of said portable electronic device;

at least one magnetic sensor for measuring said motion; [and]

logic for calculating said motion *with respect to a spheroid given said sensor data indicative of said motion,* and for calculating a position *on said spheroid* of said portable electronic device based on one or more measurements from said one gyroscope and said at least one magnetic sensor*;*

*logic for determining that said motion corresponds to a display command; and*

*logic for adjusting said display based on said motion and on an angle of said position on said spheroid in response to determining that said motion corresponds to said display command, said angle indicating an orientation of said portable electronic device relative to a line of sight of said holder.*

19. A controller for a display on a portable electronic device, the controller comprising:

*only* one accelerometer for measuring *sensor data indicative of* a motion of said portable electronic device *relative to a fixed point*, wherein said motion follows a preferential motion arc that is natural to eye and/or hand coordination of *a* holder of said portable electronic device;

*only* two magnetic sensors for measuring said motion; [and]

logic for calculating said motion *with respect to a spheroid given said sensor data indicative of said motion,* and for calculating a position *on said spheroid* of said portable electronic device based on one or more measurements from said *only* one accelerometer and said *only* two magnetic sensors*;*

*logic for determining that said motion corresponds to a display command; and*

*logic for adjusting said display based on said motion and on an angle of said position on said spheroid in response to determining that said motion corresponds to said display command, said angle indicating an orientation of said portable electronic device relative to a line of sight of said holder.*

* * * * *